US008991578B2

(12) United States Patent
Tanaka et al.

(10) Patent No.: US 8,991,578 B2
(45) Date of Patent: Mar. 31, 2015

(54) CLUTCH DEVICE

(75) Inventors: Satoshi Tanaka, Hirakata (JP); Yusuke Tomita, Neyagawa (JP); Yasuhiko Fujita, Moriyama (JP); Tomoyuki Nishikawa, Osaka (JP)

(73) Assignee: EXEDY Corporation, Osaka (JP)

( * ) Notice: Subject to any disclaimer, the term of this patent is extended or adjusted under 35 U.S.C. 154(b) by 221 days.

(21) Appl. No.: 13/518,810

(22) PCT Filed: Dec. 6, 2010

(86) PCT No.: PCT/JP2010/071836
§ 371 (c)(1),
(2), (4) Date: Jun. 22, 2012

(87) PCT Pub. No.: WO2011/077936
PCT Pub. Date: Jun. 30, 2011

(65) Prior Publication Data
US 2012/0255826 A1  Oct. 11, 2012

(30) Foreign Application Priority Data

Dec. 25, 2009 (JP) ................................ 2009-296332
Dec. 25, 2009 (JP) ................................ 2009-296333
Dec. 25, 2009 (JP) ................................ 2009-296334

(51) Int. Cl.
*F16D 21/06* (2006.01)
*F16D 13/72* (2006.01)
(Continued)

(52) U.S. Cl.
CPC .............. *F16D 21/00* (2013.01); *F16D 13/585* (2013.01); *F16D 21/06* (2013.01); *F16D 2013/703* (2013.01); *F16D 2021/0684* (2013.01); *F16D 21/02* (2013.01); *F16D 13/70* (2013.01); *F16D 2300/0212* (2013.01)
USPC ..................... 192/48.8; 192/70.19; 192/99 A; 192/110 B; 192/113.23

(58) Field of Classification Search
CPC ................ F16D 2021/0692; F16D 2500/1083; F16D 2300/0212
USPC ....................................................... 192/48.91
See application file for complete search history.

(56) References Cited

U.S. PATENT DOCUMENTS 2,854,110 A * 9/1958 Senkowski et al. .......... 192/48.8
3,018,864 A * 1/1962 Elfes ........................ 192/113.26
(Continued)

FOREIGN PATENT DOCUMENTS

CN   1426513 A   6/2003
JP   49-24878 U  3/1974
(Continued)

OTHER PUBLICATIONS

Office Action of the corresponding Chinese Application No. 201080058533.5, dated Mar. 18, 2014.

*Primary Examiner* — Rodney H Bonck
(74) *Attorney, Agent, or Firm* — Global IP Counselors, LLP

(57) ABSTRACT

A clutch device includes an input rotor, a rotation support mechanism, a first pressure plate, a second pressure plate, a first clutch disc assembly and a second clutch disc assembly. The input rotor includes a first disc portion and a second disc portion disposed away from the first disc portion at a predetermined space. The rotation support mechanism supports the input rotor for allowing the input rotor to be rotated with respect to a first input shaft and a second input shaft.

22 Claims, 16 Drawing Sheets

(51) Int. Cl.
*F16D 21/00* (2006.01)
*F16D 13/58* (2006.01)
*F16D 21/02* (2006.01)
*F16D 13/70* (2006.01)

(56) References Cited

U.S. PATENT DOCUMENTS

| | | | | |
|---|---|---|---|---|
| 3,179,220 | A | * | 4/1965 | Sink .............................. 192/99 A |
| 3,212,611 | A | * | 10/1965 | Ruoff et al. ................... 192/48.8 |
| 3,669,233 | A | * | 6/1972 | Kraus et al. ................. 192/48.91 |
| 2003/0024788 | A1 | * | 2/2003 | Damm et al. ............. 192/48.91 |
| 2003/0106767 | A1 | | 6/2003 | Beneton et al. |
| 2004/0238309 | A1 | * | 12/2004 | Hortenhuber et al. ..... 192/70.19 |
| 2005/0034955 | A1 | | 2/2005 | Meinhard et al. |

FOREIGN PATENT DOCUMENTS

| | | |
|---|---|---|
| JP | 52-76854 U | 6/1977 |
| JP | 59-23129 A | 2/1984 |
| JP | 60-84430 A | 5/1985 |
| JP | 63-112628 U | 7/1988 |
| JP | 64-035125 A | 2/1989 |
| JP | 08-004788 A | 1/1996 |
| JP | 2002-174262 A | 6/2002 |
| JP | 2003-120716 A | 4/2003 |
| JP | 2004-500531 A | 1/2004 |
| JP | 2004-347109 A | 12/2004 |
| JP | 2005-201372 A | 7/2005 |
| JP | 2008-133867 A | 6/2008 |
| JP | 2009-299738 A | 12/2009 |

* cited by examiner (A)

(B)

CLUTCH DEVICE

CROSS-REFERENCE TO THE RELATED APPLICATIONS

This U.S. national phase application claims priority to Japanese Patent Application Nos. 2009-296332, 2009-296333, and 2009-296334, all of which were filed on Oct. 25, 2009. The entire disclosure of Japanese Patent Application Nos. 2009-296332, 2009-296333, and 2009-296334 is hereby incorporated herein by reference.

TECHNICAL FIELD

The present invention relates to a clutch device for transmitting power from an engine to a transmission.

BACKGROUND ART

Automatic transmissions (ATs) have been known as means for automatically shifting gears of vehicles. In recent years, a mainstream type of the ATs has a combinational structure of, for instance, a torque converter, a plurality of planet gears and a plurality of clutches. Such a type of AT does not require an operator to perform clutch operations, normally required in manual transmissions (MTs), in starting moving a vehicle, stopping a vehicle and shifting gears due to a continuous gear shifting action by the torque converter and an automatic switching among the plural clutches.

However, torque converters are configured to transmit power through fluid. Therefore, the power transmission efficiency of the ATs is lower than that of the MTs configured to mechanically couple the input side and the output side directly in transmitting torque. Therefore, the ATs have a drawback of degrading fuel consumption of the vehicles although having an advantage of reducing operators' effort.

In view of the above, automated manual transmissions (AMTs), structured based on the MTs, have been proposed for reliably achieving the transmission efficiency of the MTs, and simultaneously, eliminating the need of clutch operations. In the AMTs, the clutch operations of the MTs and the gear-shifting operations of the transmissions are automated. Therefore, the AMTS can reliably achieve a transmission efficiency equivalent to that of the well-known MTs, and simultaneously, eliminate the need of clutch operations.

However, the AMTS are configured to decouple the clutches in performing a gear-shifting operation similarly to the MTs and torque transmission is thereby temporarily prevented. Vehicles travel only by means of inertia force without accelerating while torque transmission is prevented. Such torque transmission prevention greatly affects the acceleration performance of vehicles and tends to make operators feel uncomfortable.

In view of the above, AMTs employing a twin clutch device have been proposed for solving the drawback of the torque transmission prevention (see e.g., PTL 1).

Japan Laid-open Patent Application Publication No. JP-A-2002-174262 (PTL 1) is an example of the related art.

Japan Laid-open Patent Application Publication No. JP-A-2003-120716 (PTL 2) is an example of the related art.

SUMMARY

Technical Problems (1) In the clutch device described in PTL 1, however, a cover member including two flywheels is supported by an engine crankshaft and a transmission. Therefore, rotation of the two flywheels may become unstable depending on adjustment accuracy of the axis alignment of the engine and the transmission. Unstable flywheel rotation results in unstable clutch device performance.

It is a first object of the present invention to stabilize clutch device performance.

(2) Further, two clutches can be simultaneously coupled in the clutch device described in PTL 1. However, no countermeasure for this perspective has been proposed so far.

It is a second object of the present invention to provide a clutch device for inhibiting two clutches from being simultaneously coupled.

(3) Incidentally, clutch disc assemblies have been known as mechanisms for transmitting power from an engine to a transmission. This type of clutch disc assembly includes a friction part, an input member, an output member and an elastic member. The elastic member elastically couples the input member and the output member in the rotational direction. The friction part is fixed to the input member.

The input member includes, for instance, a clutch plate that the friction part is fixed and a retaining plate fixed to the clutch plate. The elastic member is held by the clutch plate and the retaining plate while being elastically deformable (see e.g., PTL 2).

However, the clutch disc assembly described in PTL 1 has difficulty in reducing manufacturing cost because compatible use of a component is not taken into consideration in the clutch disc assembly.

It is a third object of the present invention to provide a clutch disc assembly whereby manufacturing cost can be reduced.

A clutch device according to a first aspect of the present invention is a device for transmitting power from an engine to first and second input shafts of a transmission. The clutch device includes an input rotor, a rotary support mechanism, a first pressure plate, a second pressure plate, a first clutch disc assembly and a second clutch disc assembly. The input rotor includes a first disc portion and a second disc portion. The second disc portion is disposed away from the first disc portion at a predetermined space. The rotary support mechanism is disposed between the input rotor and at least either of the first and second input shafts. The rotary support mechanism supports the input rotor for allowing the input rotor to be rotated with respect to the first and second input shafts. The first pressure plate is disposed within the input rotor. The first pressure plate is disposed unitarily rotatably with and axially movably with respect to the first disc portion. The second pressure plate is disposed within the input rotor. The second pressure plate is disposed unitarily rotatably with and axially movably with respect to the second disc portion. The first clutch disc assembly is coupled to the first input shaft. The first clutch disc assembly includes a first friction part. The first friction part is disposed between the first disc portion and the first pressure plate. The second clutch disc assembly is coupled to the second input shaft. The second clutch disc assembly includes a second friction part. The second friction part is disposed between the second disc portion and the second pressure plate.

In the clutch device, the rotary support mechanism is disposed between the input rotor and at least either of the first input shaft and the second input shaft. Further, the rotary support mechanism supports the input rotor for allowing it to be rotated with respect to the first input shaft and the second input shaft.

Based on the above, the clutch device according to the first aspect of the present invention can enhance rotational stability of the input rotor and stabilize its performance.

A clutch device according to a second aspect of the present invention is a device for transmitting power from an engine to first and second input shafts of a transmission. The clutch device includes an input rotor, a first clutch, a second clutch, a first drive mechanism and a second drive mechanism. The input rotor receives power transmitted thereto from the engine. The first clutch is disposed swichably between a first transmitting state of transmitting power from the input rotor to the first input shaft and a first blocking state of blocking power transmission from the input rotor to the first input shaft. The second clutch is disposed switchably between a second transmitting state of transmitting power from the input rotor to the second input shaft and a second blocking state of blocking power transmission from the input rotor to the second input shaft. The first drive mechanism is a mechanism for operating power transmission of the first clutch. The first drive mechanism includes a first drive support member. The first drive support member is configured to be axially moved by a first stroke in switching the first clutch from the first blocking state to the first transmitting state. The second drive mechanism is a mechanism for operating power transmission of the second clutch. The second drive mechanism includes a second drive support member. The second drive support member is configured to be axially moved by a second stroke in switching the second clutch from the second blocking state to the second transmitting state. A drive clearance is configured to be produced axially between the first drive support member and the second drive support member in the first blocking state and the second blocking state. The drive clearance is less than a sum of the first stroke and the second stroke.

In the clutch device, the drive clearance is produced axially between the first drive support member and the second drive support member in the first blocking state and the second blocking state. The drive clearance is less than the sum of the first stroke (SL1) and the second stroke (SL2). Therefore, the first drive support member and the second drive support member interfere with each other even in causing the first clutch (C1) and the second clutch (C2) to be simultaneously coupled.

Based on the above, the clutch device according to the second aspect of the present invention can inhibit the first clutch (C1) and the second clutch (C2) from being simultaneously coupled.

A clutch disc assembly according to a third aspect of the present invention is configured to transmit power from an input rotor to an output rotor. The clutch disc assembly includes an annular friction part, an input member, an output member and an elastic member. The annular friction part is disposed slidably with the input rotor. The input member receives the friction part coupled thereto. The output member is coupled to the output rotor. The elastic member elastically couples the input member and the output member in a rotational direction. The input member includes a fixation plate, a fixation member and a holding plate. The fixation plate has at least a fixation hole. The fixation hole (holes) axially penetrates through the fixation plate. The fixation member is inserted into the fixation hole (holes). The fixation member fixes the friction part to the fixation plate. The holding plate has at least a spare hole. The spare hole (holes) axially penetrates through the holding plate. The holding plate holds the elastic member in an elastically deformable state together with the fixation plate. The spare hole (holes) is disposed in a radial position substantially the same as a radial position of the fixation hole (holes).

In the clutch disc assembly, the spare hole (holes) and the fixation hole (holes) are disposed in substantially the same radial position. Therefore, the same friction part can be fixed to any one of the fixation plate and the holding plate. It is thus possible to compatibly use a component.

Based on the above, the clutch disc assembly according to the third aspect of the present invention can reduce manufacturing cost.

DETAILED DESCRIPTION OF THE PREFERRED EMBODIMENTS

<Entire Structure of Clutch Device>

Figure 1:
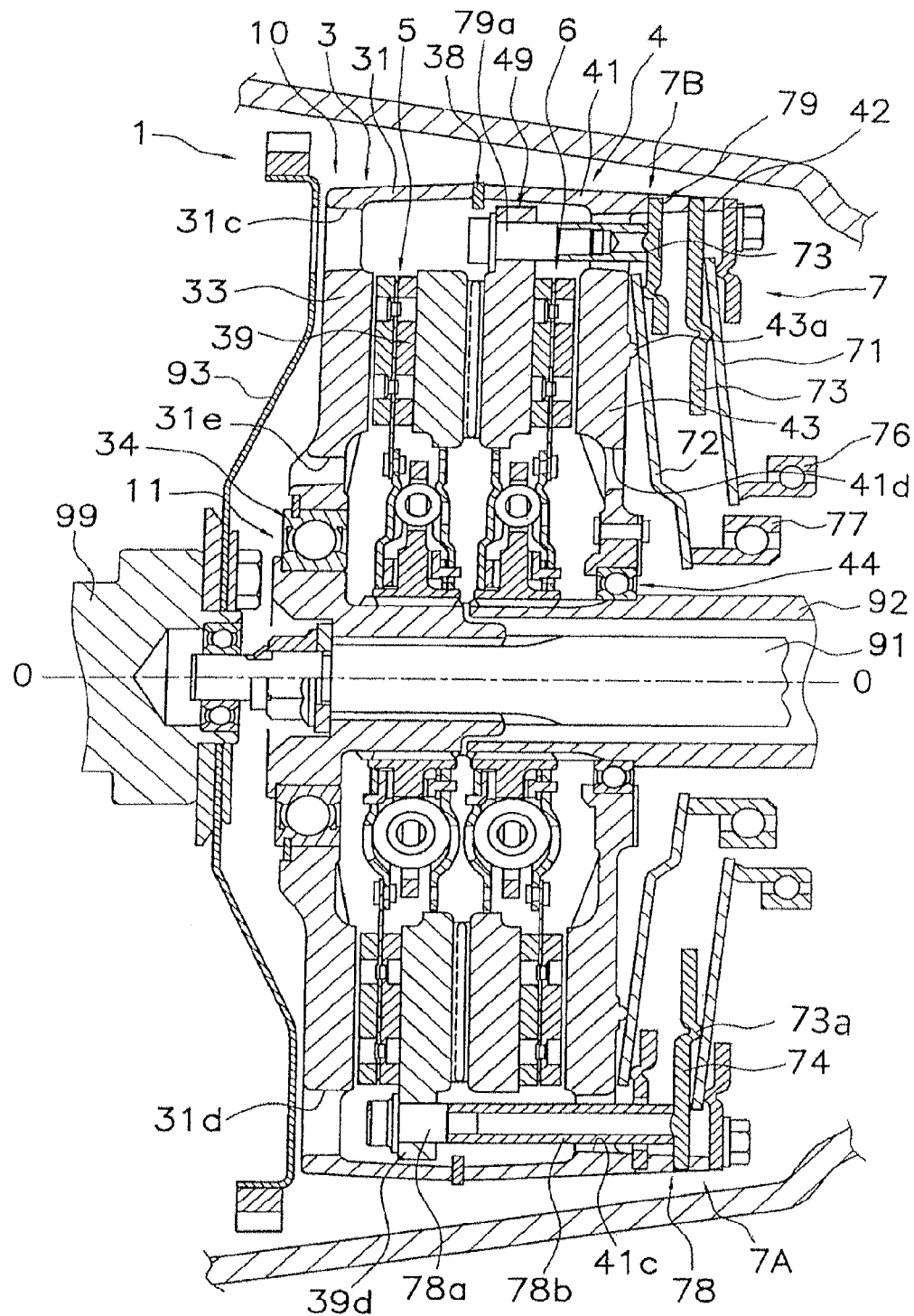
FIG. 1 is a cross-sectional view of a clutch device.
Figure 2:
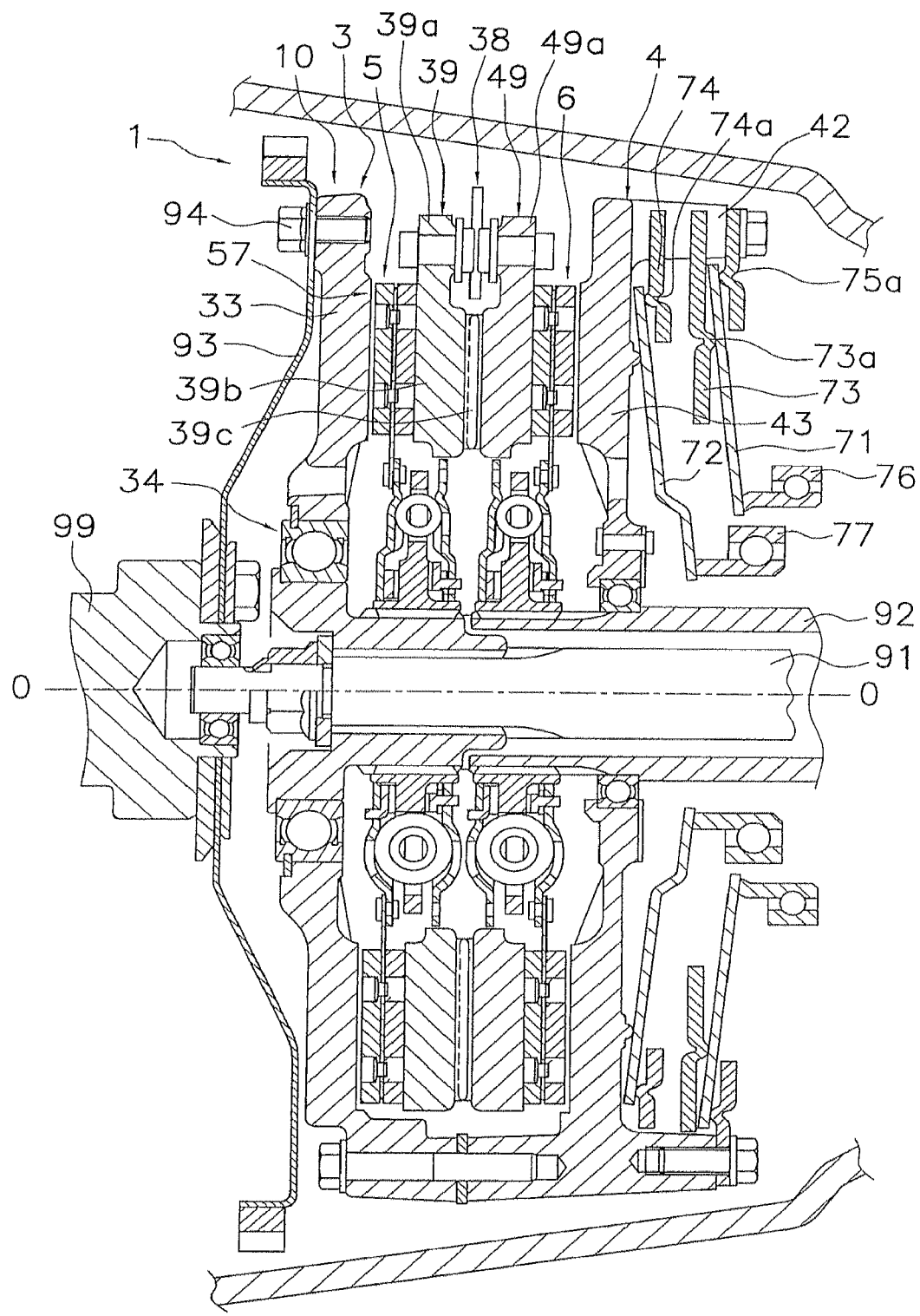
FIG. 2 is a cross-sectional view of the clutch device.

As illustrated in FIGS. 1 to 9, a clutch device 1 is a device for transmitting power from an engine to a first input shaft 91 and a second input shaft 92 of a transmission. The clutch device 1 includes an input rotor 10, a first pressure plate 39, a second pressure plate 49, a first clutch disc assembly 5, a second clutch disc assembly 6 and a drive mechanism 7. A first clutch C1 is formed by the input rotor 10, the first pressure plate 39, the first clutch disc assembly 5 and a first drive mechanism 7A of the drive mechanism 7. A second clutch C2 is formed by the input rotor 10, the second pressure plate 49, the second clutch disc assembly 6 and a second drive mechanism 7B of the drive mechanism 7. Both of the first clutch C1 and the second clutch C2 are so-called normal open type clutches. The first clutch C1 is configured to transmit power at first, third and fifth speed stages, whereas the second clutch C2 is configured to transmit power at second and fourth speed stages.

<Input Rotor 10>

The input rotor 10 is a member receiving power transmitted from the engine. The input rotor 10 is coupled to a crankshaft 99 through a flexible plate 93. The inner peripheral part of the flexible plate 93 is fixed to the crankshaft 99 by means of at least a bolt 99a, while the outer peripheral part thereof is fixed to the input rotor 10 by means of at least a bolt 94. A bearing 98 is fixed into an end of the crankshaft 99. The tip of the first input shaft 91 is rotatably supported by the bearing 98.

The input rotor 10 mainly includes a first flywheel 3, a second flywheel 4, an intermediate plate 38, three first strap plates 82 and three second strap plates 85.

(1) First Flywheel 3

The first flywheel 3 includes an annular first disc portion 33, three first fixation portions 31, a plurality of first insertion holes 31d, a plurality of second insertion holes 31c and a plurality of first vent holes 31e. The first fixation portions 31 are circular-arc portions protruding from the outer peripheral part of the first disc portion 33 towards the second flywheel 4. The first fixation portions 31 are aligned at equal pitches in the circumferential direction.

Figure 9:
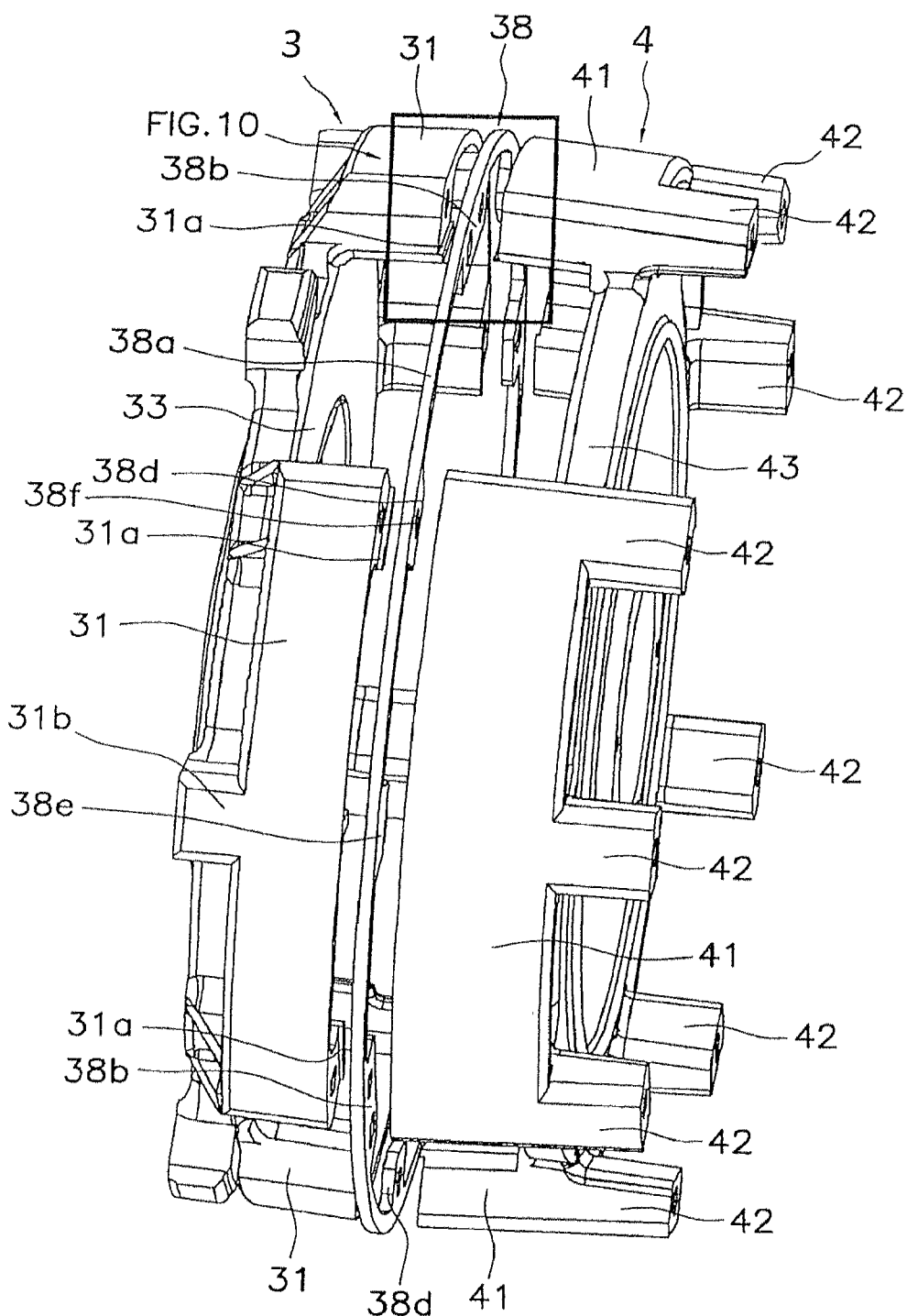
FIG. 9 is an exploded perspective view of the clutch device.
Figure 10:
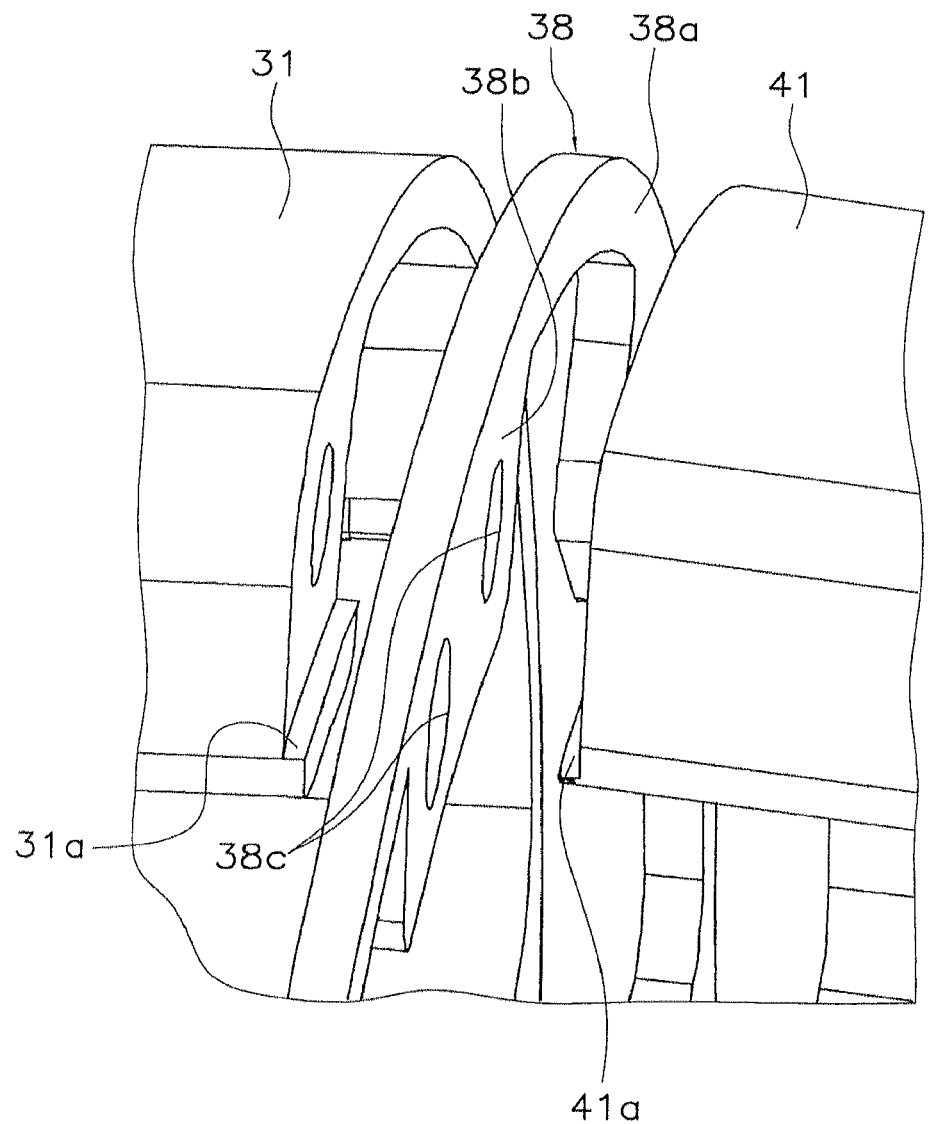
FIG. 10 is a partial enlarged view of FIG. 9.

As illustrated in FIGS. 9 and 10, each first fixation portion 31 includes first positioning portions 31a on the tip thereof. The first positioning portions 31a protrude further axially from each first fixation portion 31. The first positioning portions 31a come into contact with the inner peripheral surfaces of second fixation portions 38d of the intermediate plate 38 in the radial direction. Accordingly, the radial position of the intermediate plate 38 is determined with respect to the first flywheel 3.

The first insertion holes 31d axially penetrate the first flywheel 3 while being disposed correspondingly to first bolts 78a. The second insertion holes 31c axially penetrate the first flywheel 3 while being disposed correspondingly to second bolts 79a. The first vent holes 31e axially penetrate the first flywheel 3 while being disposed substantially in the same radial positions as first rivets 53b.

(2) Second Flywheel 4

The second flywheel 4 includes a second disc portion 43, three second fixation portions 41, nine protruding portions 42, a plurality of third insertion holes 41c and a plurality of second vent holes 41b.

The second disc portion 43 is disposed away from the first disc portion 33 in the axial direction. The second fixation portions 41 are circular-arc portions protruding from the outer peripheral part of the second disc portion 43 towards the first flywheel 3. The second fixation portions 41 are aligned at equal pitches in the circumferential direction. Three protruding portions 42 are disposed on each second fixation portion 41. Three protruding portions 42 of each second fixation portion 41 are aligned at equal pitches in the circumferential direction, while being protruding from the outer peripheral part of the second disc portion 43 towards the transmission (i.e., to the opposite side of the first flywheel 3). Further, the second disc portion 43 includes support protruding portions 43a protruding towards the transmission. The support protruding portions 43a come into contact with a second diaphragm spring 72.

As illustrated in FIGS. 9 and 10, each second fixation portion 41 includes second positioning portions 41a on the tip thereof. The second positioning portions 41a are disposed while being opposed to the first positioning portions 31a in the axial direction. The second positioning portions 41a protrude further from each second fixation portion 41 in the axial direction. The second positioning portions 41a come into contact with the inner peripheral surfaces of the second fixation portions 38d of the intermediate plate 38 in the radial direction. Accordingly, the radial position of the intermediate plate 38 is determined with respect to the second flywheel 4.

(3) Intermediate Plate 38

The intermediate plate 38 is unitarily rotatable with the first flywheel 3 and the second flywheel 4 while being interposed between the first flywheel 3 and the second flywheel 4. Specifically, the intermediate plate 38 includes an annular intermediate plate main body 38a, three first fixation portions 38b, the second fixation portions 38d and protruding portions 38e. The intermediate plate main body 38a is interposed axially between the first fixation portions 31 and the second fixation portions 41. The first fixation portions 38b, the second fixation portions 38d and the protruding portions 38e protrude radially inwards from the intermediate plate main body 38a. Each first fixation portion 38b includes two first holes 38c. One end of each first strap plate 82 and that of each second strap plate 85 are fixed to the intermediate plate 38 using one of the first holes 38c of each first fixation portion 38b. Each second fixation portion 38d includes a second hole 38f.

(4) First Strap Plates 82

The first strap plates 82 elastically couple the first pressure plate 39 to the intermediate plate 38 in the axial direction while the first pressure plate 39 is unitarily rotatable with the intermediate plate 38. For example, each first strap plate 82 is formed by three plates laminated one above the other. A first end 82a of each first strap plate 82 is fixed to each first fixation portion 38b of the intermediate plate 38 by means of a third rivet 81. A second end 82b of each first strap plate 82 is fixed to each first protruding portion 39a of the first pressure plate 39 by means of a first rivet 83. Each first strap plate 82 is disposed between two adjacent first fixation portions 31 in the circumferential direction.

(5) Second Strap Plates 85

The second strap plates 85 elastically couple the second pressure plate 49 to the intermediate plate 38 in the axial direction while the second pressure plate 49 is unitarily rotatable with the intermediate plate 38. For example, each second strap plate 85 is formed by three plates laminated one above the other. A first end 85a of each second strap plate 85 is fixed to each first fixation portion 38b of the intermediate plate together with the first end 82a of each first strap plate 82 by means of the third rivet 81. In other words, the third rivets 81 fix the first strap plates 82 and the second strap plates 85 to the intermediate plate 38. On the other hand, a second end 85b of each second strap plate 85 is fixed to each second protruding portion 49 of the second pressure plate 49 by means of a second rivet 84. Each second strap plate 85 is disposed between two adjacent second fixation portions 41 in the circumferential direction.

<Rotation Support Mechanism 11>

A rotation support mechanism 11 is disposed between the first input shaft 91 and the input rotor 10 while being disposed between the second input shaft 92 and the input rotor 10. The rotation support mechanism 11 supports the input rotor 10 in a rotatable state with respect to the first and second input shafts 91 and 92.

Specifically, the rotation support mechanism 11 includes a first bearing 34, a second bearing 44 and a support member 35. The first bearing 34 is disposed between the first disc portion 33 and the first input shaft 91. The first bearing 34 supports the first disc portion 33 in a rotatable state with respect to the first input shaft 91. The first bearing 34 is disposed between the support member 35 and the first disc portion 33. The first bearing 34 is prevented from axially moving with respect to the first disc portion 33 by a snap ring 34a.

The second bearing 44 is disposed between the second disc portion 43 and the second input shaft 92. The second bearing 44 supports the second disc portion 43 in a rotatable state with respect to the second input shaft 92. The second bearing 44 is prevented from moving towards the transmission by the second input shaft 92.

The support member 35 is attached onto the first input shaft 91 and supports the first flywheel 3 and the first clutch disc assembly 5. The support member 35 includes a first cylindrical portion 35b, a second cylindrical portion 36a formed on an end of the first cylindrical portion 35b and a positioning portion 35c. The first cylindrical portion 35b is fitted onto a spline of the first input shaft 91. The first cylindrical portion 35b includes a spline formed on the outer periphery thereof. The first cylindrical portion 35b is fitted into a first hub 51 of the first clutch disc assembly 5. The first cylindrical portion 35b is prevented from moving towards the engine with respect to the first input shaft 91 by a ring 36a and a fixation member 36b. The outer diameter of the first cylindrical portion 35b is substantially the same as that of the second input shaft 92. Therefore, it is possible to use the first hub 51 and a second hub 61 as compatible components.

The second cylindrical portion 35a is fitted into the inner peripheral side of the first bearing 34. The outer diameter of the second cylindrical portion 35a is greater than that of the first cylindrical portion 35b. The inner diameter of the second cylindrical portion 35a is greater than that of the first cylindrical portion 35b. The ring 36a and the fixation member 36b are disposed on the inner peripheral side of the second cylindrical portion 35a.

The positioning portion 35c is an annular portion protruding radially outwards from the second cylindrical portion 35a. The positioning portion 35c is disposed on the engine-side edge of the second cylindrical portion 35a. The first bearing 34 is axially positioned by the second cylindrical portion 35a.

<First Pressure Plate 39>

The first pressure plate 39 is disposed within the input rotor 10 while being unitarily rotatable with and axially movable with respect to the first disc portion 33. Specifically, the first pressure plate 39 includes a first main body 39b having a substantially disc shape, a plurality of first fins 39c, three first protruding portions 39a and a plurality of first support portions 39d.

Figure 12:
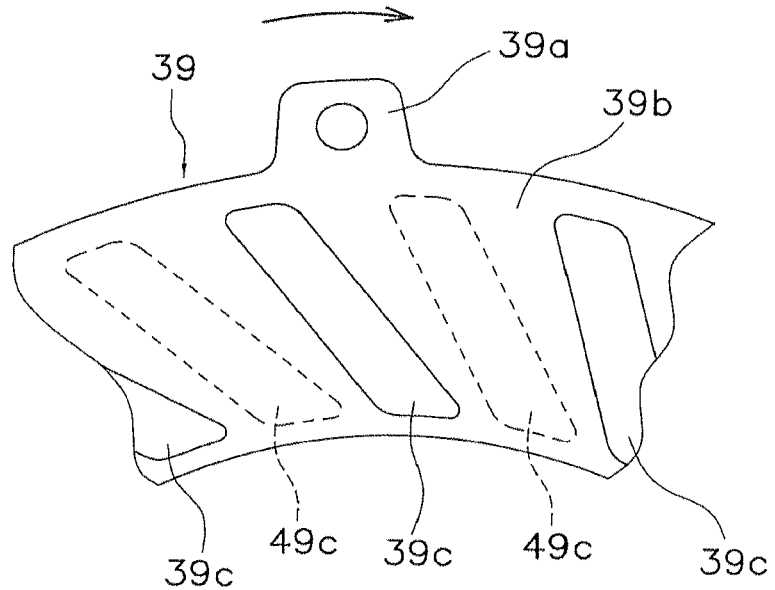
FIG. 12 includes a partial plan view (A) of a first pressure plate and a partial plan view (B) of a second pressure plate.
Figure 12:
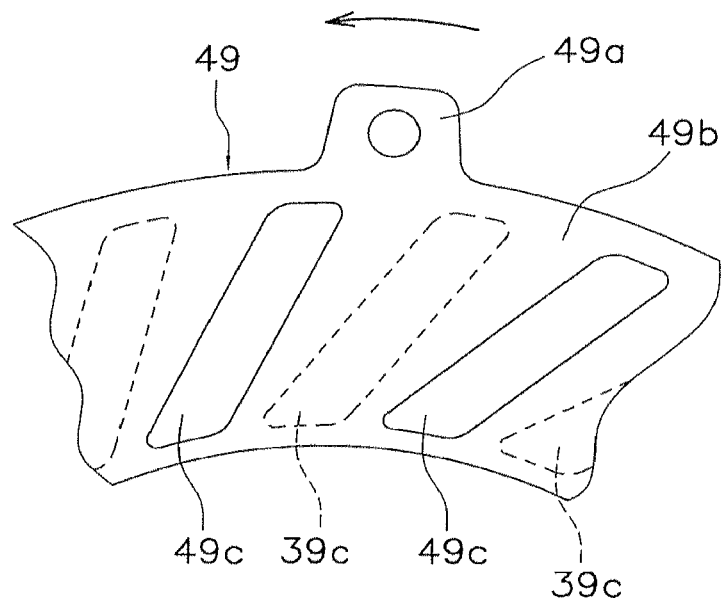

The first main body 39b is disposed while being axially opposed to the first disc portion 33. As illustrated in FIG. 12(A), the plural first fins 39c protrude towards the second disc portion 43 from the first main body 39b while being circumferentially aligned at predetermined intervals. The first fins 39c are circumferentially aligned at equal pitches.

The three first protruding portions 39a protrude radially outwards from the first main body 39b while being circumferentially aligned at equal pitches. The second ends 82b of the first strap plates 82 are fixed to the first protruding portions 39a. The first support portions 39d protrude radially outwards from the first main body 39b while being circumferentially aligned at equal pitches. A first drive support member 78 of the first drive mechanism 7A is coupled to the first support portions 39d.

<Second Pressure Plate 49>

The second pressure plate 49 is disposed within the input rotor 10 while being unitarily rotatable with and axially movable with respect to the second disc portion 43. Specifically, the second pressure plate 49 includes a second main body 49b having a substantially disc shape, a plurality of second fins 49c, three second protruding portions 49a and a plurality of second support portions 49d.

The second main body 49b is disposed while being axially opposed to the second disc portion 43. As illustrated in FIG. 12(B), the plural second fins 49c protrude towards the first disc portion 33 from the second main body 49b while being circumferentially aligned at predetermined intervals. The second fins 49c are circumferentially aligned at equal pitches. Each first fin 39c is partially disposed between adjacent two second fins 49c in the circumferential direction. The first fins 39c and the second fins 49c are alternately disposed in the circumferential direction.

The three second protruding portions 49a protrude radially outwards from the second main body 49b while being circumferentially aligned at equal pitches. The second ends 85b of the second strap plates 85 are fixed to the second protruding portions 49a. The second support portions 49d protrude radially outwards from the second disc portion 43 while being circumferentially aligned at equal pitches. A second drive support member 79 of the second drive mechanism 7B is coupled to the second support portions 49d.

<First Clutch Disc Assembly 5>

The first clutch disc assembly 5 is an assembly for transmitting power from the input rotor 10 to the first input shaft 91. The first clutch disc assembly 5 is coupled to the first input shaft 91 through the support member 35. The first clutch disc assembly 5 includes a first friction part 57, a first input member 52, the first hub 51 and a plurality of first springs 55.

The first friction part 57 includes a pair of annular-shaped first friction facings 57a and an annular-shaped first core plate 57b to which the paired first friction facings 57a are fixed. The first friction part 57 (more specifically, the first friction facings 57a) is disposed axially between the first disc portion 33 and the first pressure plate 39. The first friction part 57 is disposed slidably with the input rotor 10 and the first pressure plate 39.

The first input member 52 is a member to which power is transmitted from the first friction part 57. The first input member 52 is coupled to the first friction part 57. The first input member 52 includes a first clutch plate 53, a first retaining plate 54 and the first rivets 53b. The first clutch plate 53 includes a plurality of first fixation holes 53a axially penetrating therethrough. The first fixation holes 53a are formed in the outer periphery of the first clutch plate 53. The first rivets 53b are inserted into the first fixation holes 53a for fixing the first friction part 57 to the first clutch plate 53. The first retaining plate 54 holds the first springs 55 in an elastically deformable state together with the first clutch plate 53. The first retaining plate 54 includes a plurality of first spare holes 54a axially penetrating therethrough. The first spare holes 54a are disposed in substantially the same radial positions as the first fixation holes 53a. The inner diameter of each first spare hole 54a is substantially the same as that of each first fixation hole 53a.

The first spare holes 54a are disposed while being axially opposed to the first fixation holes 53a. The first spare holes 54a are formed in the outer periphery of the first retaining plate 54.

The first hub 51 is coupled to the first input shaft 91 through the support member 35. The first springs 55 are supported by the first input member 52 while being elastically deformable. The first springs 55 elastically couple the first input member 52 and the first hub 51 in the rotational direction.

<Second Clutch Disc Assembly 6>

The second clutch disc assembly 6 is an assembly for transmitting power from the input rotor 10 to the second input shaft 92 and is coupled to the second input shaft 92. The second clutch disc assembly 6 includes a second friction part 67, a second input member 62, the second hub 61 and a plurality of second springs 65.

The second friction part 67 includes a pair of annular-shaped second friction facings 67a and an annular-shaped second core plate 67b to which the paired second friction facings 67 are fixed. The second friction part 67 (more specifically, the second friction facings 67a) is disposed axially between the second disc portion 43 and the second pressure plate 49. The second friction part 67 is disposed slidably with the input rotor 10 and the second pressure plate 49.

The second input member 62 is a member to which power is transmitted from the second friction part 67. The second input member 62 is coupled to the second friction part 67. The second input member 62 includes a second clutch plate 63, a second retaining plate 64 and second rivets 63b. The second clutch plate 63 includes a plurality of second fixation holes 63a axially penetrating therethrough. The second fixation holes 63a are formed in the outer periphery of the second clutch plate 63. The second rivets 63b are inserted into the second fixation holes 63a for fixing the second friction part 67 to the second clutch plate 63. The second retaining plate 64 holds the second springs 65 in an elastically deformable state together with the second clutch plate 63. The second retaining plate 64 includes a plurality of second spare holes 64a axially penetrating therethrough. The second spare holes 64a are disposed in substantially the same radial positions as the second fixation holes 63a. The inner diameter of each second spare hole 64a is substantially the same as that of each second fixation hole 63a. The second spare holes 64a are disposed while being axially opposed to the second fixation holes 63a. The second spare holes 64a are formed in the outer periphery of the second retaining plate 64.

The second hub 61 is coupled to the second input shaft 92. The second springs 65 are supported by the second input member 62 while being elastically deformable. The second springs 65 elastically couple the second input member 62 and the second hub 61 in the rotational direction.

<Drive Mechanism 7>

(1) First Drive Mechanism 7A

The first drive mechanism 7A is a mechanism for operating power transmission of the first clutch C1. The first drive mechanism 7A is configured to transmit axial pressing force to the first pressure plate 39. The first drive mechanism 7A includes the first drive support member 78, the first bolts 78a and a first diaphragm spring 71. The first drive support member 78 is supported by the input rotor 10. The first bolts 78a couple the first drive support member 78 to the first pressure plate 39 in a detachable state while being screwed into the first drive support member 78 and the first support portions 39d of the first pressure plate 39. The first diaphragm spring 71 is configured to transmit driving force to the first drive support member 78 for moving the first drive support member 78 towards the first disc portion 33 with respect to the input rotor 10.

The first diaphragm spring 71 includes a first coupling portion 71a having an annular shape, a plurality of first intermediate portions 71d and a plurality of first lever portions 71b. The first intermediate portions 71d extend radially inwards from the first coupling portion 71a while being circumferentially aligned at predetermined intervals. The first lever portions 71b extend radially further from the first intermediate portions 71d while being circumferentially aligned at predetermined intervals.

A maximum dimension H11 of each first lever portion 71b in the circumferential direction is greater than a maximum dimension H12 of each first intermediate portion 71d in the circumferential direction. A radial dimension H14 of the first coupling portion 71a is same as or less than a radial dimension H13 from each first lever portion 71b to the first coupling portion 71a (corresponding to a radial dimension of each first intermediate portion 71d). The first coupling portion 71a axially comes into contact with the first drive support member 78.

The first drive support member 78 includes a second support plate 73 having an annular shape and six first tubular members 78b. The second support plate 73 includes a second main body 73c having an annular shape, a protruding portion 73a protruding towards the transmission, six second drive protruding portions 73b protruding radially outwards from the second main body 73c and three second guide portions 73d. The first tubular members 78b are fixed to the second drive protruding portions 73b on a one-to-one basis. Each second drive protruding portion 73b is disposed between adjacent two of the protruding portions 42. Each second guide portion 73d is disposed between adjacent two protruding portions 42 that are disposed on one ends of adjacent two second fixation portions 41. The second support plate 73 is supported by the second fixation portions 41 while being unitarily rotatable with and axially movable with respect to the second flywheel 4.

(2) Second Drive Mechanism 7B

The second drive mechanism 7B is a mechanism for operating power transmission of the second clutch C2. The second drive mechanism 7B is configured to transmit axial pressing force to the second pressure plate 49. The second drive mechanism 7B includes the second drive support member 79, the second bolts 79a and the second diaphragm spring 72.

The second drive support member 79 is supported by the input rotor 10. The second bolts 79a couple the second drive support member 79 to the second pressure plate 49 in a detachable state while being screwed into the second drive support member 79. The second diaphragm spring 72 is configured to transmit driving force to the second drive support member 79 for moving the second drive support member 79 towards the second disc portion 43 with respect to the input rotor 10.

The second diaphragm spring 72 includes a second coupling portion 72a having an annular shape, a plurality of second intermediate portions 72d and a plurality of second lever portions 72b. The second intermediate portions 72d extend radially inwards from the second coupling portion 72a while being circumferentially aligned at predetermined intervals. The second lever portions 72b extend radially further from the second intermediate portions 72d while being circumferentially aligned at predetermined intervals.

A maximum dimension H21 of each second lever portion 72b in the circumferential direction is greater than a maximum dimension H22 of each second intermediate portion 72d in the circumferential direction. A radial dimension H24 of the second coupling portion 72a is same as or less than a radial dimension H23 from each second lever portion 72b to the second coupling portion 72a (corresponding to a radial dimension of each second intermediate portion 72d). The second coupling portion 72a axially comes into contact with the second drive support member 79.

The second drive support member 79 includes a third support plate 74 having an annular shape and six second tubular members 79b. The third support plate 74 includes a third main body 74c having an annular shape, a third protruding portion 74a protruding towards the engine, six third drive protruding portions 74b protruded radially outwards from the third main body 74c, and three third guide portions 74d. The second tubular members 79b are fixed to the third drive protruding portions 74b on a one-to-one basis. Each third drive protruding portion 74b is disposed between adjacent two of the protruding portions 42. Each third guide portion 74d is disposed between adjacent two protruding portions 42 that are disposed on one ends of adjacent two second fixation portions 41. The third support plate 74 is supported by the second fixation portions 41 while being unitarily rotatable with and axially movable with respect to the second flywheel 4.

<Relation between Stroke and Transmission Torque>

Relations between stroke and transmission torque of the first clutch C1 and those of the second clutch C2 will be hereinafter explained using FIGS. 13(A) and 13(B). FIG. 13(A) corresponds to the clutch device 1, whereas FIG. 13(B) corresponds to a clutch device as a comparative example. In FIG. 13(A), the horizontal axis represents strokes of the first and second pressure plates 39 and 49 while the vertical axis represents torque capacities of the first and second clutches C1 and C2. Further, the right end of the horizontal axis is set as the origin of the stroke of the first pressure plate 39 (i.e., a position where the driving force of the drive mechanism 7 does not act). On the other hand, the left end of the horizontal axis is set as the origin of the second pressure plate 49 (i.e., a position where the driving force of the drive mechanism 7 does not act).

With the aforementioned configuration, the first clutch C1 is herein disposed while being switchable between a first transmitting state S11 and a first blocking state S12. In the first transmitting state S11, power is transmitted from the input rotor 10 to the first input shaft 91. In the first blocking state S12, power is blocked from being transmitted from the input rotor 10 to the first input shaft 91. Specifically, the first drive support member 78 (or the first pressure plate 39) is disposed while being configured to be axially moved by a first stroke SL1 when the first clutch C1 is switched from the first blocking state S12 to the first transmitting state S11. Therefore, the displacement of the first pressure plate 39 from the first transmitting state S11 to the first blocking state S12 corresponds to the first stroke SL1. The maximum torque capacity represented in FIG. 13(A) is a torque capacity where the first clutch C1 is completely coupled and indicates a torque capacity in the first stroke SL1.

Further, with the aforementioned configuration, the second clutch C2 is disposed while being switchable between a second transmitting state S21 and a second blocking state S22. In the second transmitting state S21, power is transmitted from the input rotor 10 to the second input shaft 92. In the second blocking state S22, power is blocked from being transmitted from the input rotor 10 to the second input shaft 92. The second drive support member 79 (or the second pressure plate 49) is disposed while being configured to be axially moved by a second stroke SL2 when the second clutch C2 is switched from the second blocking state S22 to the second transmitting state S21. Therefore, the displacement of the second pressure plate 49 from the second transmitting state S21 to the second blocking state S22 corresponds to the second stroke SL2. The maximum torque capacity represented in FIG. 13(A) is a torque capacity where the second clutch C2 is completely coupled and indicates a torque capacity in the second stroke SL2.

Figure 3:
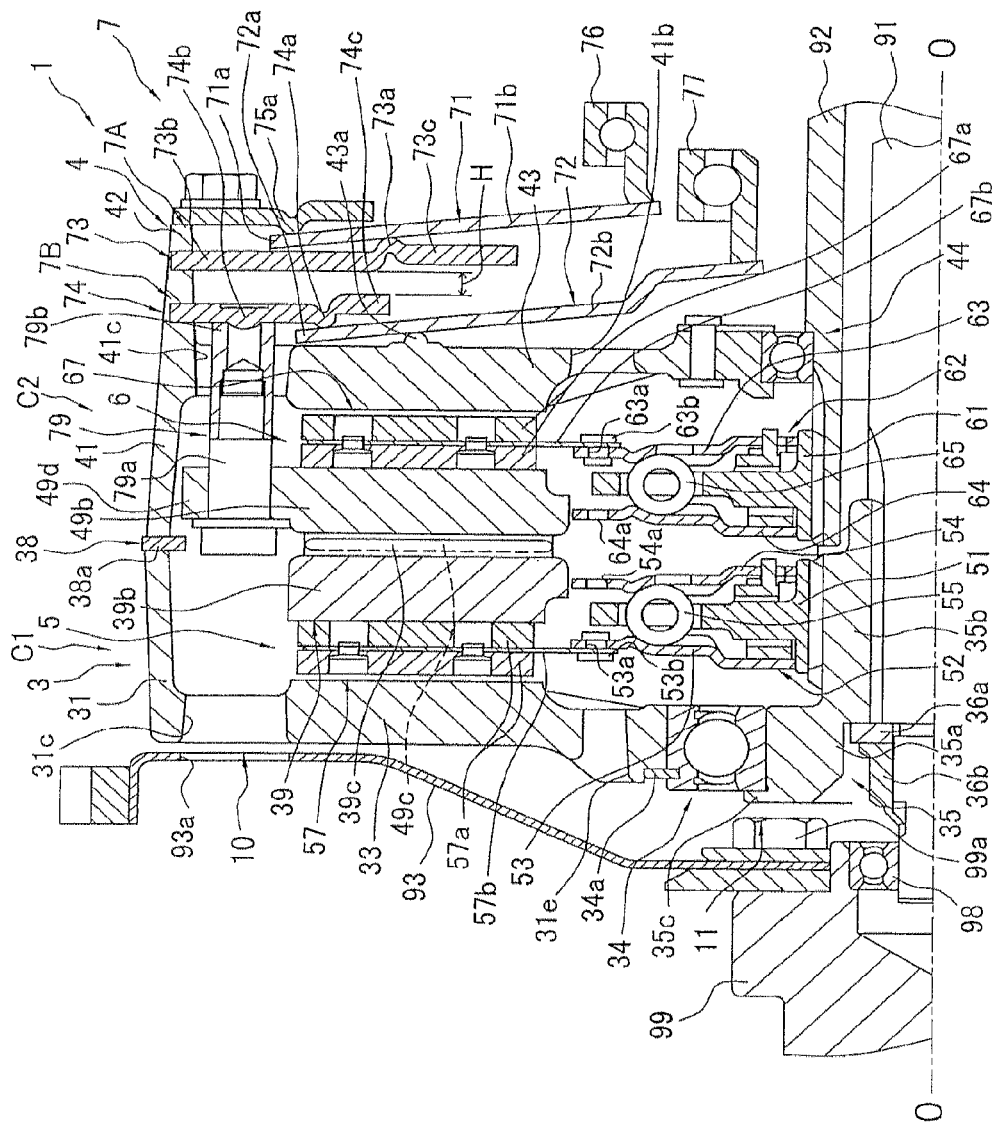
FIG. 3 is a cross-sectional view of the clutch device (the upper half of FIG. 1).
Figure 4:
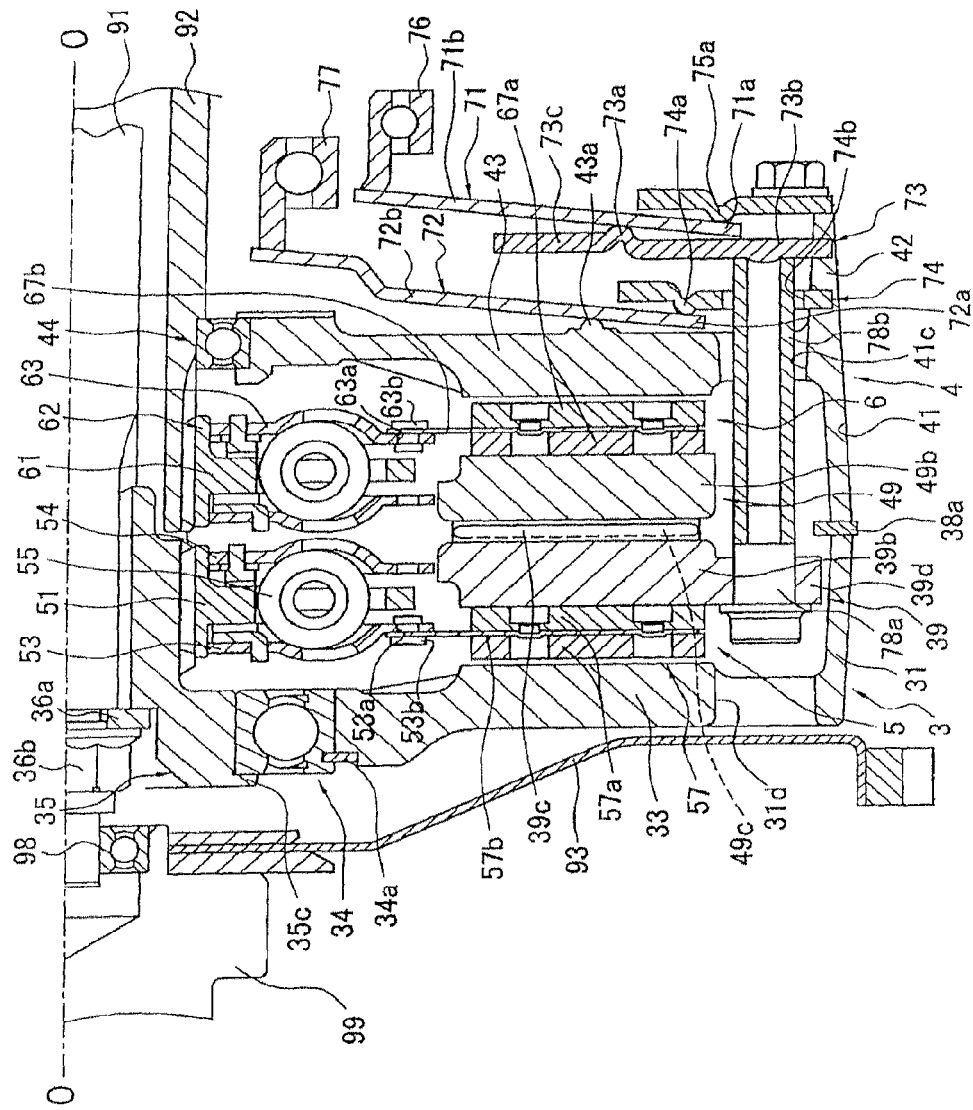
FIG. 4 is a cross-sectional view of the clutch device (the lower half of FIG. 1).
Figure 5:
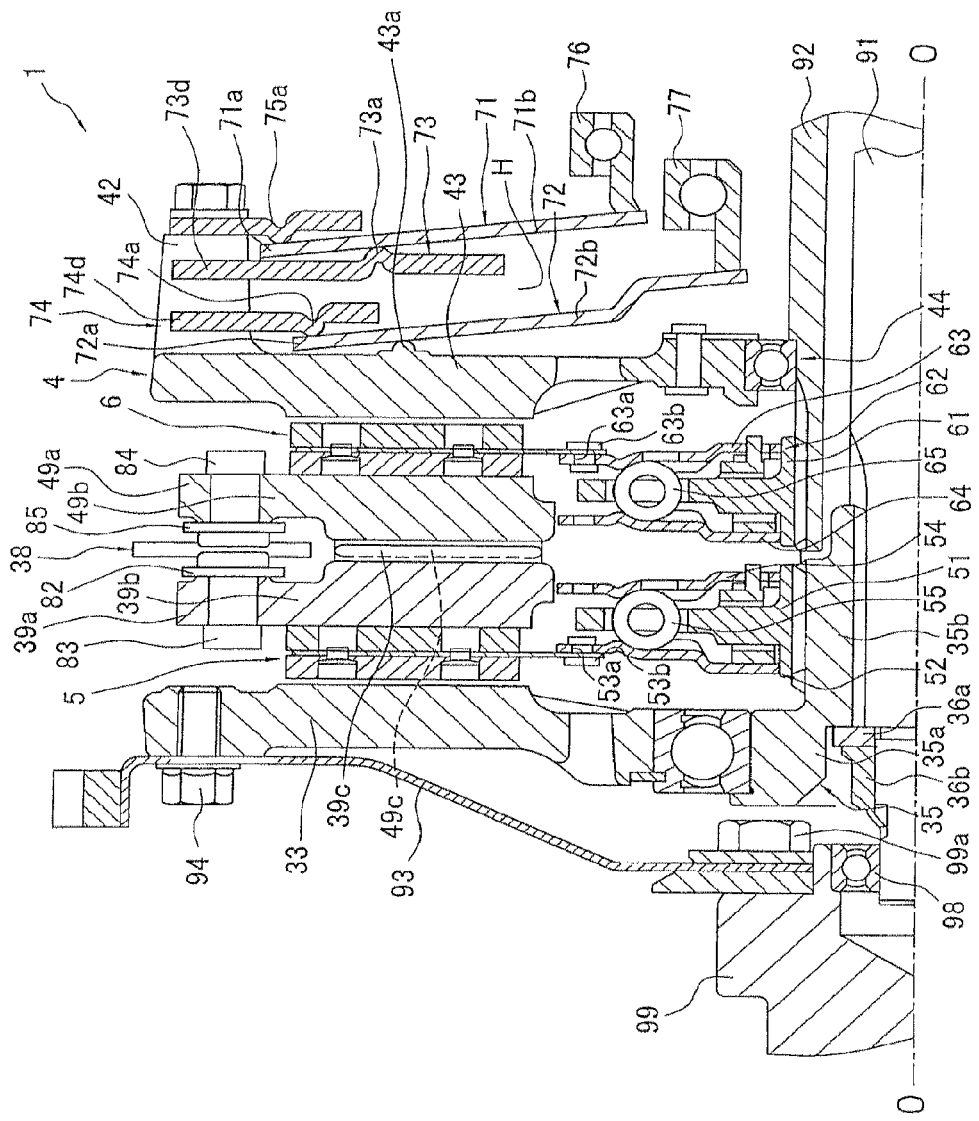
FIG. 5 is a cross-sectional view of the clutch device (the upper half of FIG. 2).
Figure 6:
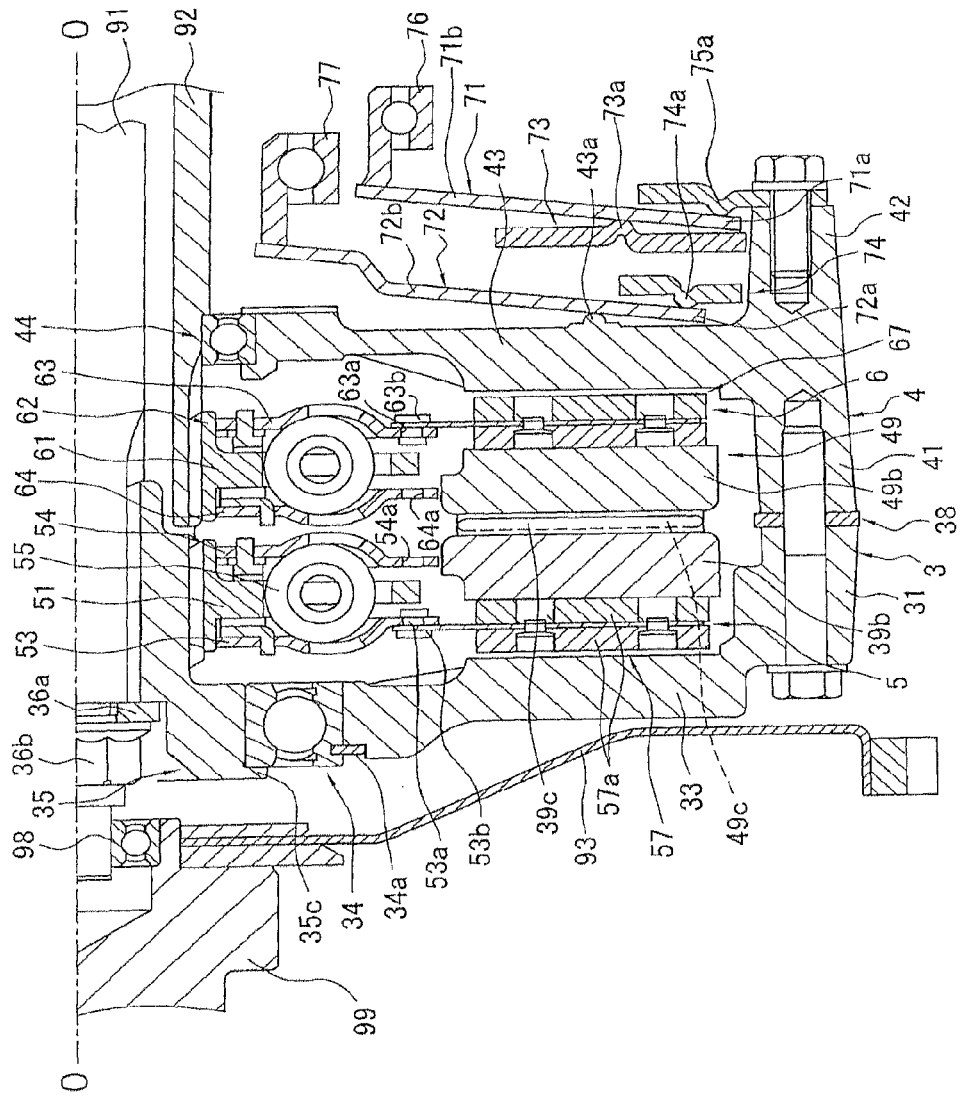
FIG. 6 is a cross-sectional view of the clutch device (the lower half of FIG. 2).

As illustrated in FIGS. 3 and 4, in the clutch device 1, a drive clearance H is produced axially between the first drive support member 78 and the second drive support member 79 in the first blocking state S12 and the second blocking state S22. More specifically, the drive clearance H is produced axially between the second support plate 73 and the third support plate 74 in the first blocking state S12 and the second blocking state S22. The drive clearance H is set to be less than the sum of the first stroke SL1 and the second stroke SL2. Accordingly, the first clutch C1 and the second clutch C2 are inhibited from being simultaneously coupled.

Further, from the perspective of the relation between torque capacities, the torque capacity of the first clutch C1 in the first transmitting state S11 is a first maximum torque capacity T1max. The torque capacity of the second clutch C2 in the second transmitting state S21 is a second maximum torque capacity T2max. In the second transmitting state S21 of the second clutch C2, the torque capacity of the first clutch C1 is a first minimum torque capacity T1min when the first drive support member 78 and the second drive support member 79 come into contact with each other. In the first transmitting state S11 of the first clutch C1, the transmission torque of the second clutch C2 is a second minimum torque capacity T2min when the first drive support member 78 and the second drive support member 79 come into contact with each other.

Where an intermediate contact state is defined as a state that the first drive support member 78 and the second drive support member 79 come into contact with each other in an intermediate position of the drive clearance H, a sum Tm of the transmission torque of the first clutch C1 and that of the second clutch C2 in the intermediate contact state is less than or equal to a sum T12max of the first maximum torque capacity T1max and the second minimum torque capacity T2min. Likewise, the sum Tm of the transmission torque of the second clutch C2 and that of the first clutch C1 in the intermediate contact state is less than or equal to a sum T21max of the second maximum torque capacity T2max and the first minimum torque capacity T1min.

Further, the drive clearance H is set so that a greater one (T_total) of the maximum torque capacity T12max and the maximum torque capacity T21max can be less than a torque (T_lock) at which wheels are locked (slip) against the road.

Thus, adjustment of the drive clearance H can prevent both of the first and second clutches C1 and C2 from being simultaneously coupled, and further, prevent locking or slipping of wheels.

It should be noted in the clutch device as a comparative example that the sum Tm of the transmission torque of the second clutch C2 and that of the first clutch C1 in the intermediate contact state becomes greater than a lock torque (T_lock) as represented in FIG. 13(B). Therefore, the first and second clutches C1 and C2 are simultaneously coupled and this may cause locking (slipping) of wheels <Actions of Clutch Device 1>

Actions of the clutch device 1 will be explained. In the states illustrated in FIGS. 1 to 6, pressing force is not applied to the first and second clutches C1 and C2 by the drive mechanism 7 while power transmission is not executed in the first and second clutches C1 and C2. In the state, the first pressure plate 39 is held by the first strap plates 82 in the axial positions illustrated in FIGS. 1 to 6, while the second pressure plate 49 is held by the second strap plates 85 in the axial positions illustrated in FIGS. 1 to 6. When power is transmitted from the engine to the input rotor 10, the input rotor 10, the first pressure plate 39, the second pressure plate 49 and the drive mechanism 7 are unitarily rotated. The first input shaft 91 supports the first bearing 34 through the support member 35, while the first bearing 34 supports the first flywheel 3 in a rotatable state. On the other hand, the second input shaft 92 supports the second bearing 44, while the second bearing 44 supports the second flywheel 4 in a rotatable state. Therefore, the input rotor 10 is stably rotated.

For example, when the vehicle starts moving at the first speed, the first input shaft 91 side of the transmission is switched into the first speed and a first drive bearing 76 of the first drive mechanism 7A is pressed towards the engine by means of a first actuator (not illustrated in the figures). As a result, the first diaphragm spring 71 is elastically deformed while being pressed on a first protrusion 75a as a fulcrum. The second support plate 73 is thereby pressed towards the engine. When the second support plate 73 is pressed through the first diaphragm spring 71, the first drive support member 78 and the first pressure plate 39 are moved towards the engine. As a result, the first friction part 57 of the first clutch disc assembly 5 is interposed and held between the first pressure plate 39 and the first flywheel 3 (more specifically, the first disc portion 33), and power is transmitted to the first input shaft 91 through the first clutch disc assembly 5. With the actions, the vehicle starts moving at the first speed.

In shifting the speed stage from the first speed to the second speed, the second input shaft 92 side of the transmission is switched into the second speed. The second clutch C2 is switched into the coupled state substantially simultaneously with decoupling of the first clutch C1 while the transmission is set to be in the second speed. Specifically, driving force acting on the first drive mechanism 7A is released and the first drive bearing 76 is returned to the transmission side. As a result, the first diaphragm spring 71 is returned to the states illustrated in FIGS. 1 to 4, and power transmission through the first clutch C1 is released.

On the other hand, a second drive bearing 77 of the second drive mechanism 7B is pressed towards the engine by means of a second actuator (not illustrated in the figures). As a result, the second diaphragm spring 72 is elastically deformed while being pressed on the support protruding portion 43a as a fulcrum, and the third support plate 74 is pulled towards the transmission. When the third support plate 74 is pressed by the second diaphragm spring 72, the second drive support member 79 and the second pressure plate 49 are moved towards the transmission. As a result, the second friction part 67 of the second clutch disc assembly 6 is interposed and held between the second pressure plate 49 and the second flywheel 4 (more specifically, the second disc portion 43), and power is transmitted to the second input shaft 92 through the second clutch disc assembly 6. With the actions, the speed stage is switched from the first speed to the second speed.

<Features>

The aforementioned features of the clutch device 1 will be hereinafter comprehensively described.

(A)

(1) As illustrated in FIGS. 1 to 4, the clutch device 1 includes the rotation support mechanism 11 that supports the input rotor 10 with respect to the first and second input shafts 91 and 92 in a rotatable state. The rotation support mechanism 11 is disposed between the first input shaft 91 and the input rotor 10, while being disposed between the second input shaft 92 and the input rotor 10.

Specifically, the rotation support mechanism 11 includes the first and second bearings 34 and 44. The first bearing 34 is disposed between the first disc portion 33 of the first flywheel 3 and the first input shaft 91. The second bearing 44 is disposed between the second disc portion 43 of the second flywheel 4 and the second input shaft 92.

With the employment of such structure, it is possible to enhance the rotational stability of the input rotor 10 and stabilize the performance of the clutch device 1.

(2) As illustrated in FIGS. 1 to 4, the rotation support mechanism 11 includes the support member 35 mounted onto the first input shaft 91. The first bearing 34 is disposed between the support member 35 and the first disc portion 33. In this case, the specification of the first bearing 34 can be easily changed by replacing the support member 35 with another member with a diameter different from that of the support member 35. It is thereby possible to provide the clutch device 1 compatible with various types of transmissions.

Further, the support member 35 supports the first clutch disc assembly 5, and the outer diameter of the second input shaft 92 is substantially the same as that of the first cylindrical portion 35b of the support member 35. Therefore, it is possible to compatibly use components of the first clutch disc assembly 5 and the second clutch disc assembly 6 (i.e., the first hub 51 and the second hub 61).

Figure 7:
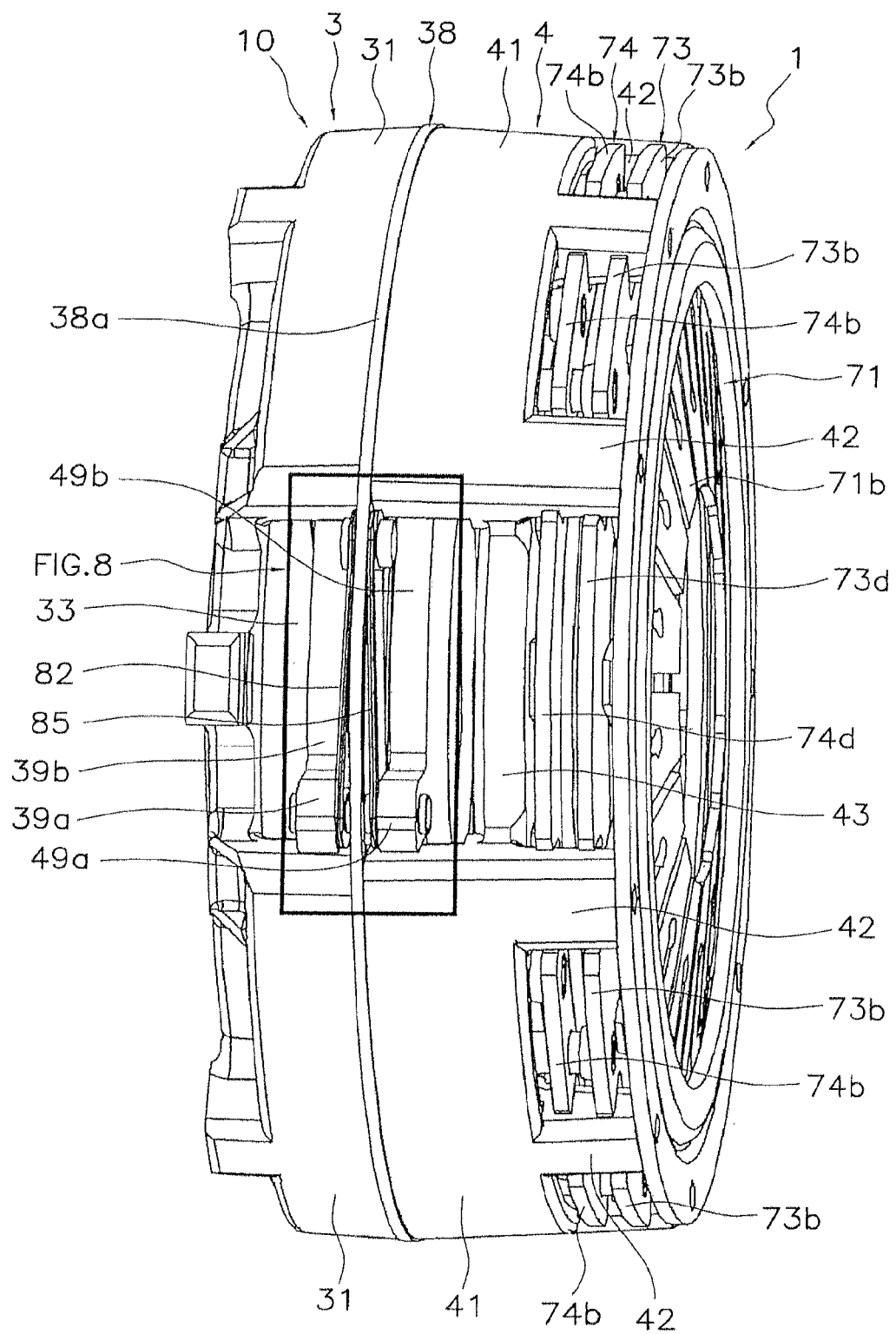
FIG. 7 is a perspective view of the clutch device.
Figure 8:
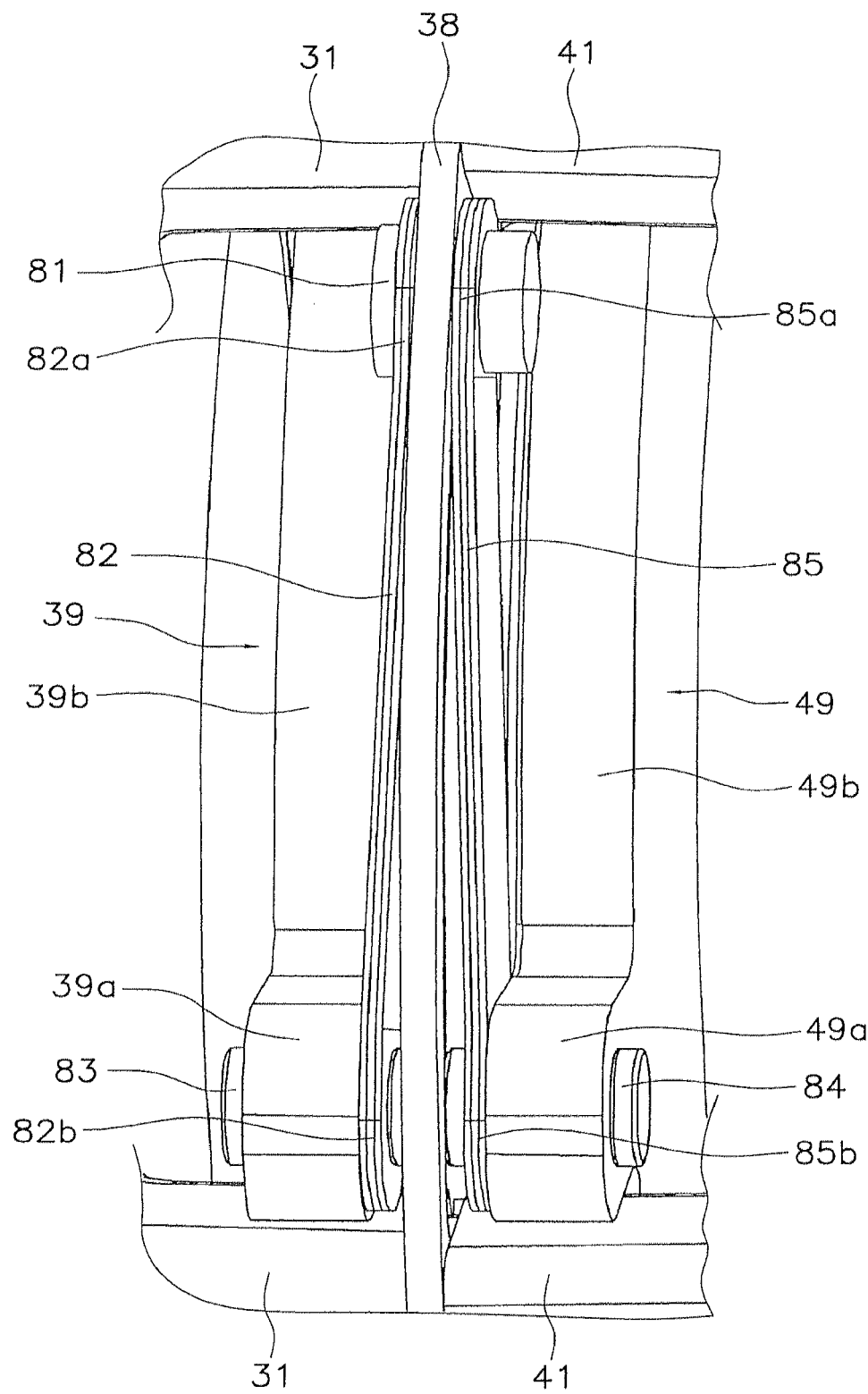
FIG. 8 is a partial enlarged view of FIG. 7.

(3) As illustrated in FIGS. 7 and 8, the input rotor 10 includes the plural third rivets 81 for fixing the first strap plates 82 and the second strap plates 85 to the intermediate plate 38. Therefore, it is possible to compatibly use a component and the number of components can be thereby reduced. In other words, it is possible to reduce manufacturing cost with the aforementioned structure.

(4) As illustrated in FIG. 12(A), the first pressure plate 39 includes the plural first fins 39c. The first fins 39c protrude towards the second disc portion 43 from the first main body 39b while being circumferentially aligned at predetermined intervals. On the other hand, as illustrated in FIG. 12(B), the second pressure plate 49 includes the second fins 49c. The second fins 49c protrude towards the first disc portion 33 from the second main body 49b while being circumferentially aligned at predetermined intervals.

Thus, it is possible to increase a heat dissipation area by providing the first fins 39c for cooling in the first pressure plate 39 and providing the second fins 49c for cooling in the second pressure plate 49. It is thereby possible to enhance durability of the first and second pressure plates 39 and 49.

Further, each first fin 39c is at least partially disposed circumferentially between adjacent two of the second fins 49c. Therefore, the air flowing between the first fins 39c and the second fins 49c reliably flows through the vicinity of the surface of the first pressure plate 39 and the vicinity of the surface of the second pressure plate 49. It is thereby possible to further enhance cooling effect for the first and second pressure plates 39 and 49.

(5) As illustrated in FIGS. 1, 3 and 4, the first drive mechanism 7A includes the first drive support member 78, the first bolts 78a and the first diaphragm spring 71. The first drive support member 78 is supported by the input rotor 10. The first bolts 78a are screwed into the first pressure plate 39 while detachably coupling the first drive support member 78 to the first pressure plate 39. The first diaphragm spring 71 transmits driving force to the first drive support member 78 so that the first drive support member 78 can be moved towards the first disc portion 33 with respect to the input rotor 10.

The first drive support member 78 is detachably attached to the first pressure plate 39 by means of the first bolts 78a. Therefore, workability is enhanced in a maintenance work.

Similarly in the case of the second drive mechanism 7B, the second drive support member 79 is detachably attached to the second pressure plate 49 by means of the second bolts 79a. Therefore, workability is enhanced in a maintenance work.

Further, the first flywheel 3 of the input rotor 10 includes the first insertion holes 31d. The first insertion holes 31d axially penetrate through the first flywheel 3 while being disposed in corresponding positions to the first bolts 78a. Therefore, an attachment/detachment work of the first bolts 78a can be easily executed.

Yet further, when the first friction part 57 is abraded, the position of the first pressure plate 39 can be adjusted in accordance with abrasion of the first friction part 57 by changing the trunk lengths of the first bolts 78a.

Similarly in the case of the second drive mechanism 7B, the second flywheel 4 includes the second insertion holes 31c. The second insertion holes 31c axially penetrate through the second flywheel 4 while being disposed in corresponding positions to the second bolts 79a. Therefore, an attachment/detachment work of the second bolts 79a can be easily executed.

Figure 11:
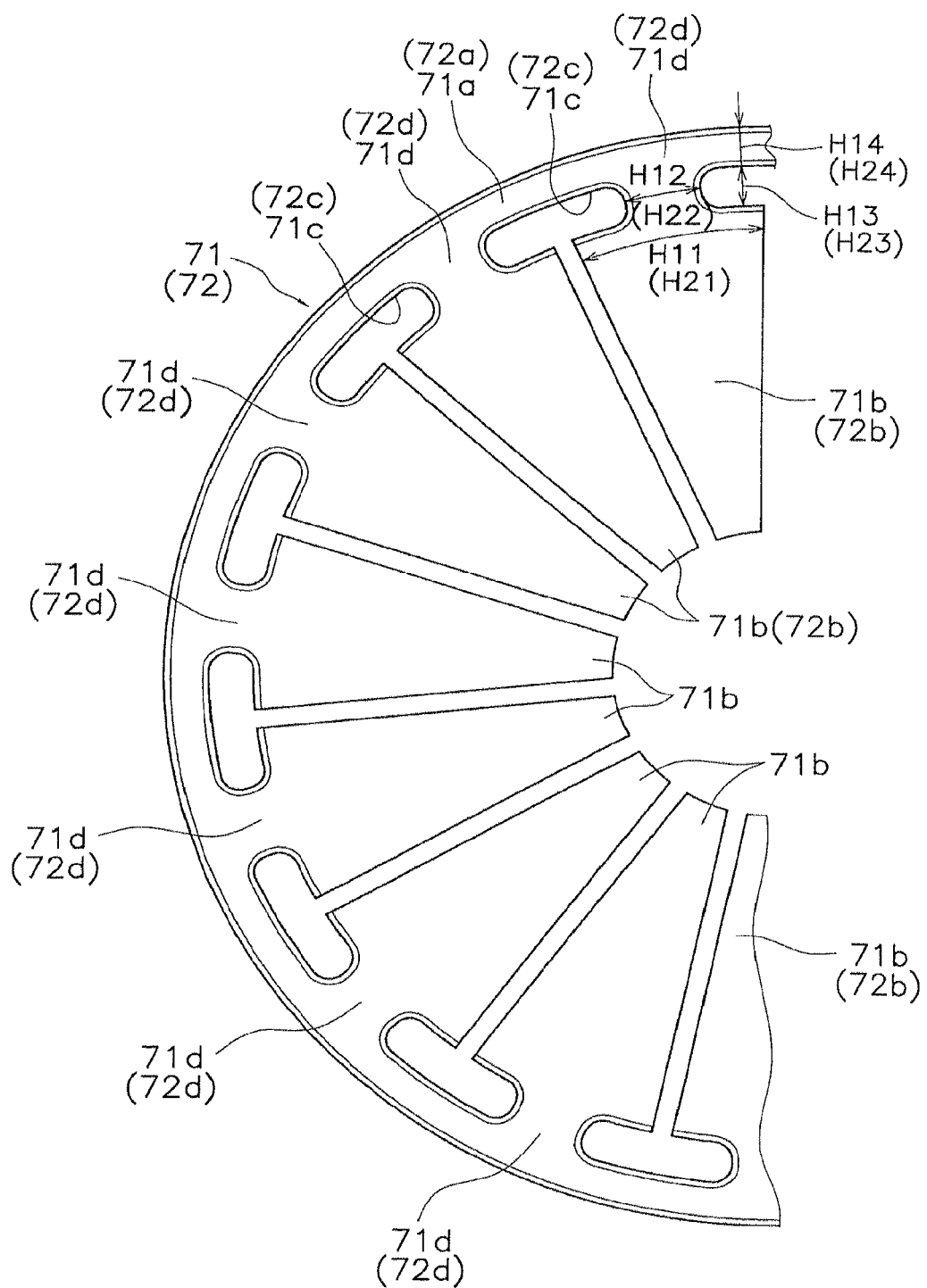
FIG. 11 is a plan view of a diaphragm spring.

(6) As illustrated in FIG. 11, the first diaphragm spring 71 includes the annular first coupling portion 71a, the plural first intermediate portions 71d and the plural first lever portions 71b. The first intermediate portions 71d extend radially inwards from the first coupling portion 71a while being circumferentially aligned at predetermined intervals. The first lever portions 71b extend radially further from the first intermediate portions 71d while being circumferentially aligned at predetermined intervals. The maximum dimension H11 of each first lever portion 71b in the circumferential direction is greater than the maximum dimension H12 of each first intermediate portion 71d in the circumferential direction. The radial dimension H14 of the first coupling portion 71a is less than the radial dimension H13 from each first lever portion 71b to the first coupling portion 71a (corresponding to the radial dimension of each first intermediate portion 71d). Therefore, it is possible to remarkably reduce the stiffness of the first diaphragm spring 71 and regulate the stiffness of the first diaphragm spring 71 to be suitable for the clutch device 1 of a normal open type.

It should be noted that the feature of the first diaphragm spring 71 is also true to the second diaphragm spring 72.

(B)

(1) As illustrated in FIGS. 3 to 6, the drive clearance H is produced axially between the first drive support member 78 and the second drive support member 79 in the first blocking state S12 and the second blocking state S22. The drive clearance H is less than the sum of the first stroke SL1 and the second stroke SL2. Therefore, it is possible to prevent the first clutch C1 and the second clutch C2 from being simultaneously coupled.

Figure 13:
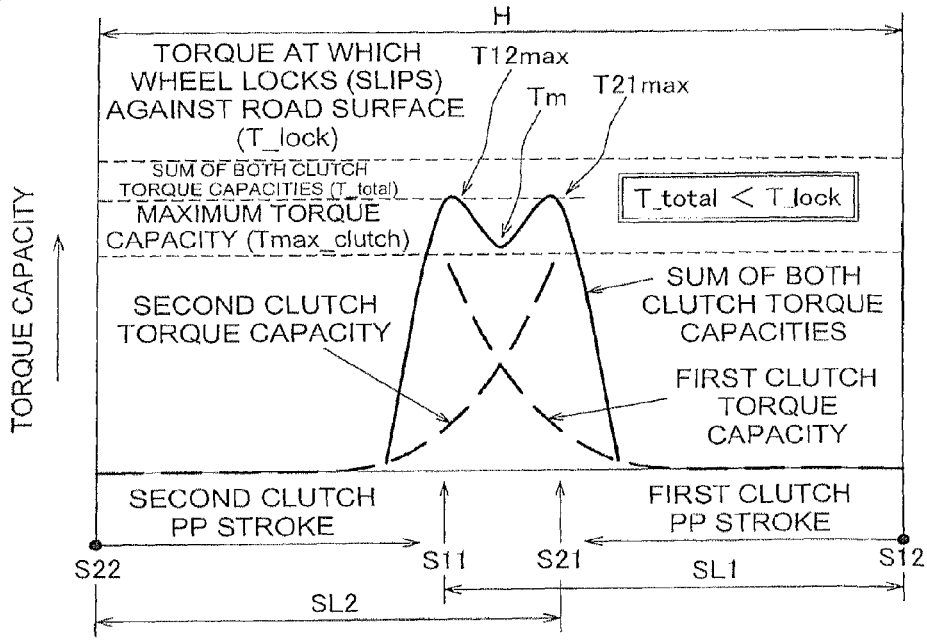
FIG. 13 includes a chart (A) representing the relation between stroke and torque capacity (an exemplary embodiment) and a chart (B) representing the relation between stroke and torque capacity (a comparative example).
Figure 13:
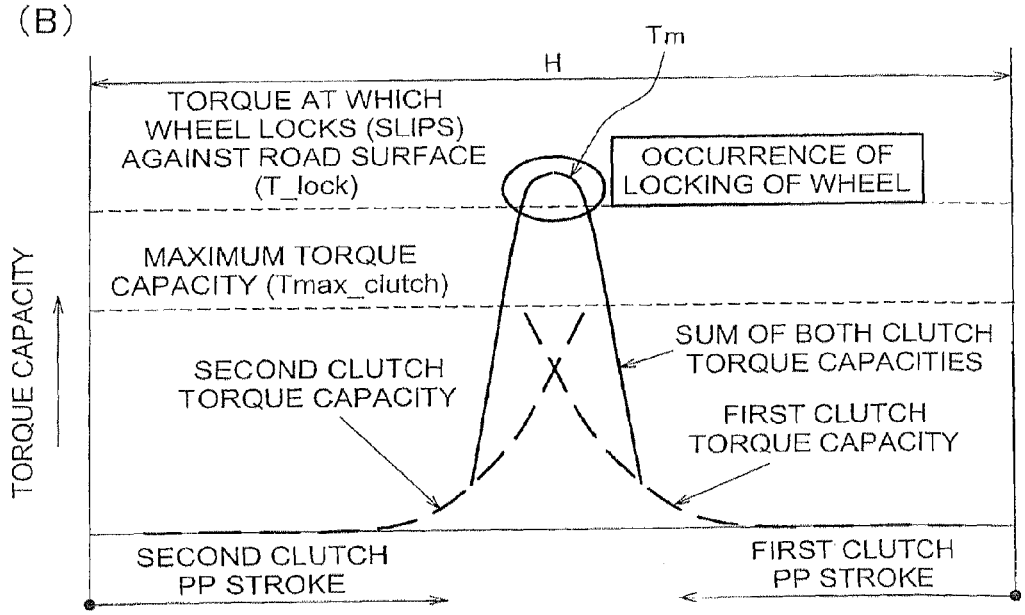

(2) As illustrated in FIG. 13, the transmission torque of the first clutch C1 in the first transmitting state S11 is the first maximum torque capacity T1max. In the first transmitting state S11 of the first clutch C1, the transmission torque of the second clutch C2 is the second minimum torque capacity T2min when the first drive support member 78 and the second drive support member 79 come into contact with each other. The state that the first drive support member 78 and the second drive support member 79 come into contact with each other in the intermediate position of the drive clearance H is the intermediate contact state. The sum Tm of the transmission torque of the first clutch C1 and that of the second clutch C2 in the intermediate contact state is less than or equal to the sum T12max of the first maximum torque capacity T1max and the second minimum torque capacity T2min. Therefore, it is possible to more reliably prevent the first clutch C1 and the second clutch C2 from being simultaneously coupled.

Further, as illustrated in FIG. 13, the transmission torque of the second clutch C2 in the second transmitting state S21 is the second maximum torque capacity T2max. In the second transmitting state S21 of the second clutch C2, the transmission torque of the first clutch C1 is the first minimum torque capacity T1min when the first drive support member 78 and the second drive support member 79 come into contact with each other. The sum Tm of the transmission torque of the second clutch C2 and that of the first clutch C1 in the intermediate contact state is less than or equal to the sum T21max of the second maximum torque capacity T2max and the first minimum torque capacity T1min. Therefore, it is possible to more reliably prevent the first clutch C1 and the second clutch C2 from being simultaneously coupled.

(C)

(1) As illustrated in FIGS. 3 to 6, the first input member 52 includes the first clutch plate 53, the first rivet/rivets 53b and the first retaining plate 54. The first clutch plate 53 has at least one first fixation hole 53a axially penetrating therethrough. The first rivet/rivets 53b is/are inserted into the first fixation hole/holes 53a for fixing the first friction part 57 to the first clutch plate 53. The first retaining plate 54 has at least one first spare hole 54a axially penetrating therethrough. The first retaining plate 54 holds the first springs 55 in an elastically deformable state together with the first clutch plate 53. The first spare hole/holes 54a is/are disposed in substantially the same radial position/positions as the first fixation hole/holes 53a. With the structure, the same first friction part 57 can be fixed to any one of the first clutch plate 53 and the first retaining plate 54. Thus, compatible use of a component can be achieved. The feature is also true to the second clutch disc assembly 6.

It should be herein noted that the device on which the first and second clutch disc assemblies 5 and 6 are mounted is not limited to the clutch device 1 and may be a single clutch device, for instance.

(2) Each first spare hole 54a has an inner diameter substantially the same as that of each first fixation hole 53a. The first spare holes 54a are disposed in positions axially opposed to the first fixation holes 53a. Further, the first fixation holes 53a are formed in the outer periphery of the first clutch plate 53. The first spare holes 54a are formed in the outer periphery of the first retaining plate 54. Therefore, compatible use of a component can be further easily achieved.

<Other Exemplary Embodiments>

The present invention is not limited to the aforementioned exemplary embodiment. A variety of changes and modifications can be herein made without departing from the scope of the present invention. It should be noted that the same reference numerals are assigned to elements having substantially the same functions as those in the aforementioned exemplary embodiment and detailed explanation thereof will be hereinafter omitted.

Figure 14:
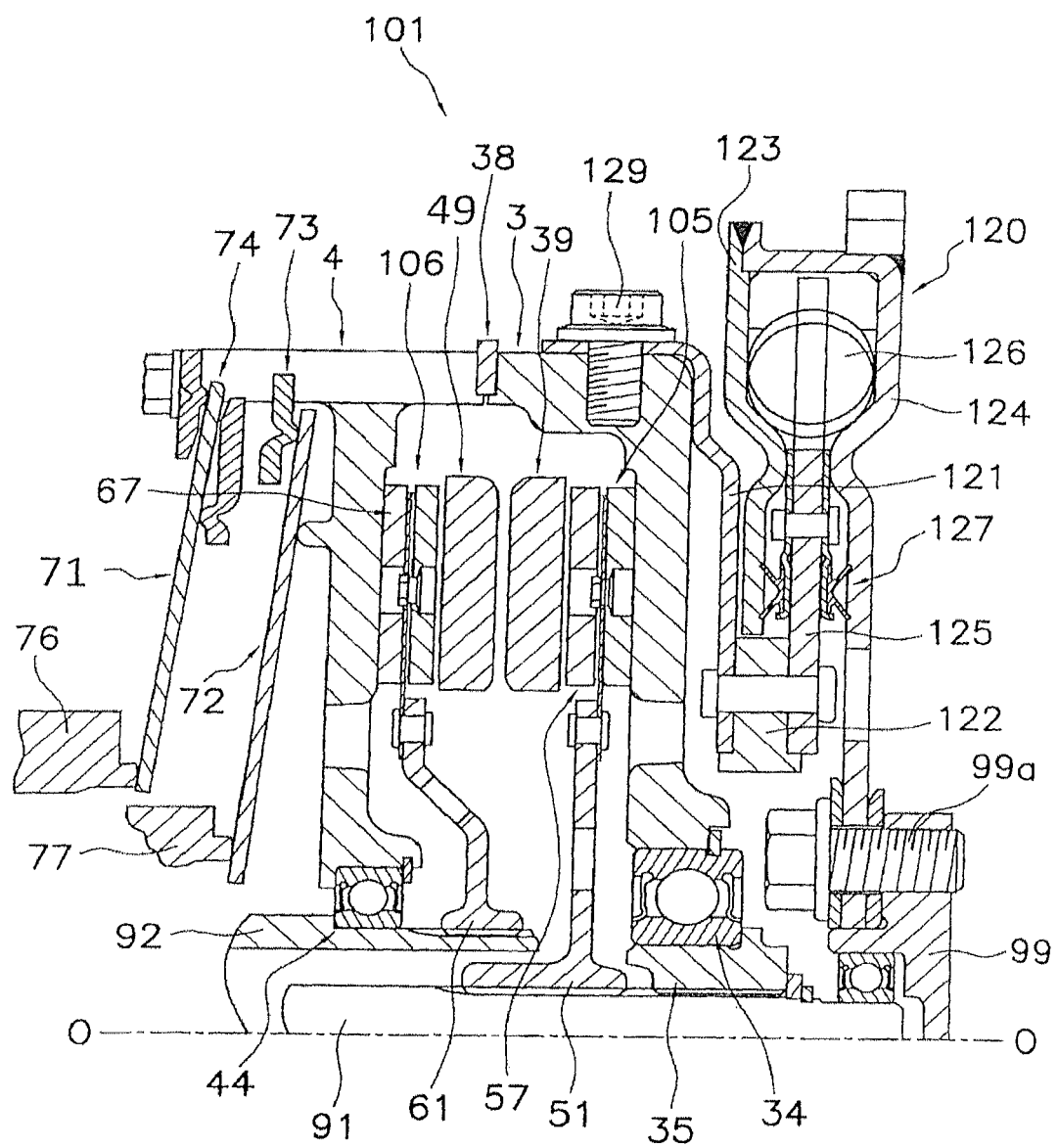
FIG. 14 is a partial cross-sectional view of a clutch device (one of the other exemplary embodiments).

(1) In the aforementioned exemplary embodiment, the damper mechanism is provided for each of the first and second clutch disc assemblies 5 and 6. However, a damper mechanism may be disposed between the engine and the input rotor 10. For example, a clutch device 101 illustrated in FIG. 14 includes a first clutch disc assembly 105, a second clutch disc assembly 106 and a damper mechanism 120 disposed between the engine and the input rotor 10. The damper mechanism 120 elastically couples the crankshaft 99 of the engine to the input rotor 10. Further, no damper mechanism is disposed in each of the first and second clutch disc assemblies 105 and 106. Specifically, the first clutch disc assembly 105 includes the first friction part 57 and the first hub 51 but does not include the first springs 55. Further, the second clutch disc assembly 106 includes the second friction part 67 and the second hub 61 but does not include the second springs 65.

On the other hand, the damper mechanism 120 includes a first input plate 124, a second input plate 123, a plurality of springs 126, an output plate 125, an intermediate member 122, a flexible plate 121 and a seal mechanism 127. The first input plate 124 is fixed to the crankshaft 99 by means of the bolt 99a. The second input plate 123 is fixed to the first input plate 124. The springs 126 are elastically deformably retained by the first input plate 124 and the second input plate 123. Further, the actuation space, accommodating the springs 126, is filled with lubricating oil and is sealed by the seal mechanism 127. The springs 126 elastically couple the first input plate 124 and the output plate 125 in the rotational direction. The intermediate member 122 is fixed to the inner periphery of the output plate 125 together with the flexible plate 121. The flexible plate 121 is fixed to the first flywheel 3 by means of bolts 129.

Even the clutch device 101 can achieve the same advantageous effects as those achieved by the clutch device of the aforementioned exemplary embodiment.

(2) In the aforementioned exemplary embodiment, the first pressure plate 39 and the second pressure plate 49 are coupled to the input rotor 10 using the first strap plates 82 and the second strap plates 85. However, another structure may be used instead. For example, in a clutch device 201 illustrated in FIG. 15, an input rotor 210 includes a shaft 299, a first support spring 297 and a second support spring 298. The shaft 299 is attached to the first flywheel 3 and the second flywheel 4. Accordingly, the first pressure plate 39 and the second pressure plate 49 are respectively supported by the shaft 299 while being unitarily rotatable with and axially movable with respect to the first flywheel 3 and the second flywheel 4. The first support spring 297 is elastically deformably supported by the shaft 299, while being disposed between the first flywheel 3 and the first pressure plate 39. The second support spring 298 is elastically deformably supported by the shaft 299, while being disposed between the second flywheel 4 and the second pressure plate 49.

Figure 15:
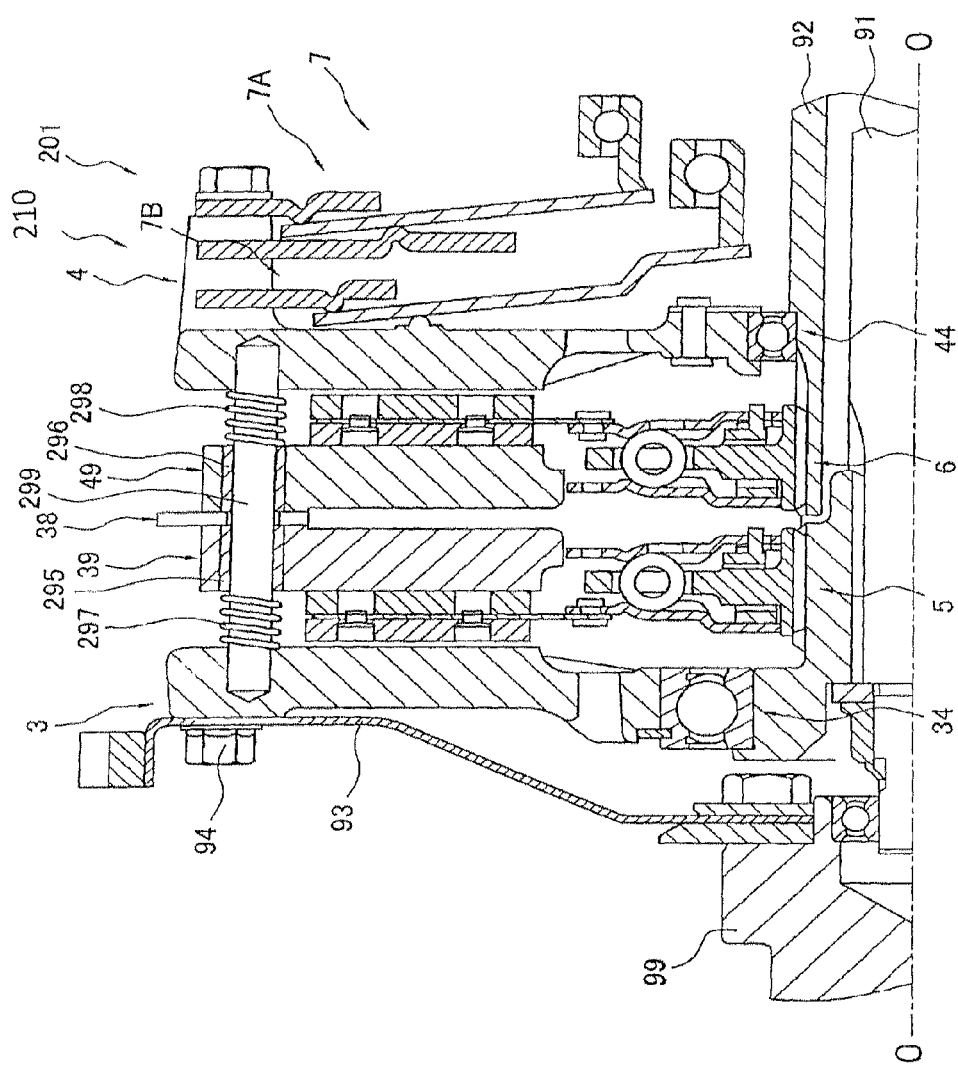
FIG. 15 is a partial cross-sectional view of a clutch device (one of the other exemplary embodiments).

Further, the first pressure plate 39 includes a first rubber member 295 (an exemplary third elastic member) having a tubular shape. The second pressure plate 49 includes a second rubber member 296 (an exemplary fourth elastic member) having a tubular shape. Specifically, as illustrated in FIG. 15, the first rubber member 295 elastically couples the shaft 299 to the first pressure plate 39 while being disposed between the shaft 299 and the first pressure plate 39. The second rubber member 296 elastically couples the shaft 299 to the second pressure plate 49 while being disposed between the shaft 299 and the second pressure plate 49. The first and second rubber members 295 and 296 can prevent the first and second pressure plates 39 and 49 from hitting with the shaft 299 and from producing sounds.

Even the clutch device 201 can achieve the same advantageous effects as those achieved by the clutch device in the aforementioned exemplary embodiment.

(3) In the aforementioned exemplary embodiment, the rotation support mechanism 11 includes both of the first and second bearings 34 and 44. However, the rotation support mechanism 11 may include only either of the bearings.

Figure 16:
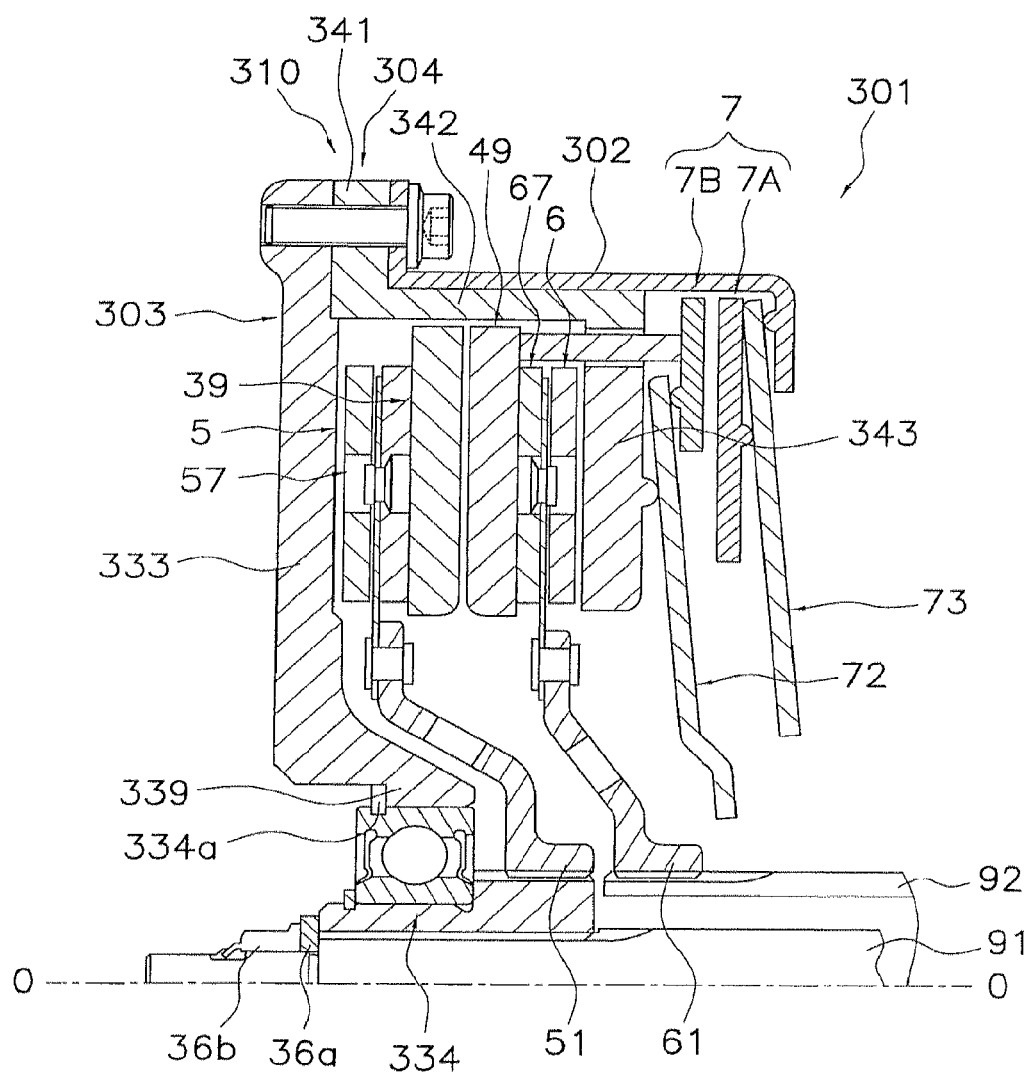
FIG. 16 is a partial cross-sectional view of a clutch device (one of the other exemplary embodiments).

For example, a clutch device 301 can be assumed as illustrated in FIG. 16. The clutch device 301 includes an input rotor 310, the first pressure plate 39, the second pressure plate 49, a bearing 334, the drive mechanism 7 and a damper mechanism (not illustrated in the figure). Similarly to the aforementioned damper mechanism 120, a mechanism for elastically coupling the crankshaft 99 and the input rotor 310 can be herein assumed as the damper mechanism.

The input rotor 310 includes a first flywheel 303, a second flywheel 304 and a cover 302. The first flywheel 303 is rotatably supported by the bearing 334. The bearing 334 is fitted onto the outer peripheral side of the support member 35.

The first flywheel 303 includes a first disc portion 333 and an inner periphery fixation portion 339. The first disc portion 333 is configured to slide along the first friction part 57 of the first clutch disc assembly 5. The inner periphery fixation portion 339 is fixed onto the outer periphery of the bearing 334 by means of a snap ring 334a. The first disc portion 333 protrudes entirely towards the engine than the inner periphery fixation portion 339 is, while being disposed closer to the engine than the bearing 334 is. The second flywheel 304 is fixed to the first flywheel 303. The second flywheel 304 includes a flanged portion 341, a tubular portion 342 and a second disc portion 343. The flanged portion 341 is fixed to the outer periphery of the first flywheel 303. The tubular portion 342 is disposed on the outer peripheral side of the first clutch disc assembly 5 and the second clutch disc assembly 6. The second disc portion 343 is configured to slide along the second friction part 67 of the second clutch disc assembly 6. The cover 302 supports the drive mechanism 7 while being fixed to the second flywheel 304.

In the clutch device 301, the first disc portion 333 is disposed closer to the engine than the bearing 334 is. Therefore, the center of gravity of the entire input rotor 310 gets closer to the bearing 334. Therefore, the input rotor 310 can be supported only by the bearing 334.

(4) In the aforementioned exemplary embodiment, the first positioning portions 31a and the second positioning portions 41a are disposed in the inner peripheral side of the intermediate plate 38. However, any suitable structure can be employed as long as the intermediate plate 38 can be thereby positioned in the radial direction. For example, the first positioning portions 31a and the second positioning portions 41a may be disposed on the outer peripheral side of the intermediate plate 38, or alternatively, may be disposed on both of the inner and outer peripheral sides of the intermediate plate 38.

The invention claimed is:

1. A clutch device for transmitting power from an engine to first and second input shafts of a transmission, the clutch device comprising:
   an input rotor including a first disc portion and a second disc portion, the second disc portion disposed away from the first disc portion at a predetermined space;
   a rotary support mechanism disposed between the input rotor and at least one of the first and second input shafts, the rotary support mechanism supporting the input rotor to be rotated with respect to the first and second input shafts, the rotary support mechanism including a first bearing disposed between the first disc portion and a support member mounted on an outer peripheral portion of the first input shaft, the first bearing being disposed between the support member and the first disc portion in a radial direction, and the first bearing supporting the first disc portion to be rotated with respect to the first input shaft;
   a first pressure plate disposed within the input rotor, the first pressure plate disposed unitarily rotatably and axially movably with respect to the first disc portion;
   a second pressure plate disposed within the input rotor, the second pressure plate disposed unitarily rotatably and axially movably with respect to the second disc portion;
   a first clutch disc assembly coupled to the first input shaft, the first clutch disc assembly including a first friction part, which is disposed between the first disc portion and the first pressure plate, the first clutch disc assembly being supported by the support member; and
   a second clutch disc assembly coupled to the second input shaft, the second clutch disc assembly including a second friction part, which is disposed between the second disc portion and the second pressure plate.

2. The clutch device recited in claim 1, wherein
   the rotary support mechanism includes a second bearing, which is disposed between the second disc portion and the second input shaft, and
   the second bearing supports the second disc portion to be rotated with respect to the second input shaft.

3. The clutch device recited in claim 1, wherein
   the input rotor includes a first rotor and a second rotor,
   the first rotor includes the first disc portion, and
   the second rotor includes the second disc portion and fixed to the first rotor.

4. The clutch device recited in claim 3, wherein
the input rotor includes an intermediate plate interposed between the first rotor and the second rotor, a first coupling member couples the first pressure plate to the intermediate plate axially elastically and unitarily rotatably therewith, a second coupling member couples the second pressure plate to the intermediate plate axially elastically and unitarily rotatably therewith, and
the intermediate plate is disposed unitarily rotatably with the first rotor and the second rotor.

5. The clutch device recited in claim 4, wherein
the input rotor includes a fixation member fixing the first coupling member and the second coupling member to the intermediate plate.

6. The clutch device recited in 4, wherein
the first rotor includes a first positioning portion, which is disposed on at least one of inner and outer peripheral sides of the intermediate plate, and
the first positioning portion radially comes into contact with the intermediate plate.

7. The clutch device recited in claim 4, wherein
the second rotor includes a second positioning portion, which is disposed on at least either of inner and outer peripheral sides of the intermediate plate, and
the second positioning portion radially comes into contact with the intermediate plate.

8. The clutch device recited in claim 4, wherein
the first rotor includes a first positioning portion, which is disposed on at least one of inner and outer peripheral sides of the intermediate plate,
the first positioning portion radially comes into contact with the intermediate plate,
the second rotor includes a second positioning portion, which the second positioning portion is disposed on at least one of inner and outer peripheral sides of the intermediate plate,
the second positioning portion radially comes into contact with the intermediate plate, and
the second positioning portion is disposed so as to be axially opposed to the first positioning portion.

9. The clutch device recited in claim 3, wherein
the input rotor includes a shaft mounted on the first rotor and the second rotor,
the shaft supports the first pressure plate and the second pressure plate unitarily rotatably and axially movably with respect to the first rotor and the second rotor, respectively,
the clutch device includes a first elastic support member and a second elastic support member,
the first elastic support member is elastically deformably supported by the shaft,
the first elastic support member is disposed between the first rotor and the first pressure plate,
the second elastic support member is elastically deformably supported by the shaft, and
the second elastic support member is disposed between the second rotor and the second pressure plate.

10. The clutch device recited in claim 9, wherein
the input rotor includes a third elastic member inserted between the shaft and the first pressure plate, and a fourth elastic member inserted between the shaft and the second pressure plate,
the third elastic member elastically couples the shaft to the first pressure plate, and
the fourth elastic member elastically couples the shaft to the second pressure plate.

11. The clutch device recited in claim 1, wherein
the first pressure plate includes a first main body having a substantially disc shape and a plurality of first fins protruding from the first main body towards the second disc portion, and
the first fins are circumferentially aligned at predetermined intervals.

12. The clutch device recited in claim 1, wherein
the second pressure plate includes a second main body having a substantially disc shape and a plurality of second fins protruding from the second main body towards the first disc portion, and
the second fins are circumferentially aligned at predetermined intervals.

13. The clutch device recited in claim 1, wherein
the first pressure plate includes a first main body having a substantially disc shape and a plurality of first fins protruding from the first main body towards the second disc portion,
the first fins are circumferentially aligned at predetermined intervals,
the second pressure plate includes a second main body having a substantially disc shape and a plurality of second fins protruding from the second main body towards the first disc portion,
the second fins are circumferentially aligned at predetermined intervals, and
each of the first fins is at least partially disposed circumferentially between two of the second fins being next to each other.

14. The clutch device recited in one of claims 1, further comprising
a first drive mechanism configured to transmit axial pressing force to the first pressure plate, wherein
the first drive mechanism includes a first drive support member supported by the input rotor, a first screw member screwed into the first drive support member, and a first drive member configured to transmit driving force to the first drive support member to be moved towards the first disc portion with respect to the input rotor, and
the first screw member detachably couples the first drive support member to the first pressure plate.

15. The clutch device recited in claim 14, wherein
the input rotor includes a first insertion hole, which axially penetrates through the input rotor, and
the first insertion hole is disposed in a position corresponding to a position of the first screw member.

16. The clutch device recited in claim 14, wherein
the first drive member includes a first coupling portion having an annular shape, a plurality of first intermediate portions extending radially inwards from the first coupling portion, and a plurality of first lever portions radially extending further from the first intermediate portions,
a maximum circumferential dimension of the first lever portion is greater than a maximum circumferential dimension of the first intermediate portion,
a radial dimension of the first coupling portion is same as or less than a radial dimension from the first lever portion to the first coupling portion,
the first intermediate portions circumferentially aligned at predetermined intervals,
the first lever portions circumferentially aligned at predetermined intervals.

17. The clutch device recited in claim 16, wherein
the first coupling portion axially comes into contact with the first drive support member.

18. The clutch device recited in claim 1, further comprising
a second drive mechanism configured to transmit axial pressing force to the second pressure plate, wherein
the second drive mechanism includes a second drive support member supported by the input rotor and a second screw member screwed into the second drive support member,
the second screw member detachably couples the second drive support member to the second pressure plate, and
a second drive member is configured to transmit driving force to the second drive support member to be moved towards the second disc portion with respect to the input rotor.

19. The clutch device recited in claim 18, wherein
the input rotor includes a second insertion hole,
the second insertion hole axially penetrates through the input rotor, and
the second insertion hole is disposed in a position corresponding to a position of the second screw member.

20. The clutch device recited in claim 18, wherein
the second drive member includes a second coupling portion having an annular shape, a plurality of second intermediate portions extending radially inwards from the second coupling portion, and a plurality of second lever portions radially extending further from the second intermediate portions,
a maximum circumferential dimension of the second lever portion is greater than a maximum circumferential dimension of the second intermediate portion,
a radial dimension of the second coupling portion is same as or less than a radial dimension from the second lever portion to the second coupling portion,
the second intermediate portions circumferentially aligned at predetermined intervals, and
the second lever portions circumferentially aligned at predetermined intervals.

21. The clutch device recited in claims 20, wherein
the first coupling portion axially comes into contact with the first drive support member.

22. The clutch device recited in claim 1, further comprising
a damper mechanism disposed between the engine and the input rotor, the damper mechanism elastically coupling a crankshaft of the engine to the input rotor.

* * * * *